United States Patent
Nishiguchi et al.

(10) Patent No.: US 10,155,854 B2
(45) Date of Patent: Dec. 18, 2018

(54) HEAT-RESISTANT SILANE CROSSLINKED RESIN MOLDED BODY AND METHOD OF PRODUCING THE SAME, HEAT-RESISTANT SILANE CROSSLINKABLE RESIN COMPOSITION AND METHOD OF PRODUCING THE SAME, SILANE MASTER BATCH, AND HEAT-RESISTANT PRODUCT USING HEAT-RESISTANT SILANE CROSSLINKED RESIN MOLDED BODY

(71) Applicant: FURUKAWA ELECTRIC CO., LTD., Tokyo (JP)

(72) Inventors: Masaki Nishiguchi, Tokyo (JP); Arifumi Matsumura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/081,301

(22) Filed: Mar. 25, 2016

(65) Prior Publication Data

US 2016/0208060 A1    Jul. 21, 2016

Related U.S. Application Data

(63) Continuation of application No. PCT/JP2014/075751, filed on Sep. 26, 2014.

(30) Foreign Application Priority Data

Sep. 27, 2013  (JP) ................................. 2013-202669

(51) Int. Cl.

| | |
|---|---|
| *C08J 3/24* | (2006.01) |
| *C08J 3/22* | (2006.01) |
| *H01B 3/22* | (2006.01) |
| *H01B 3/28* | (2006.01) |
| *H01B 3/44* | (2006.01) |
| *C08L 23/06* | (2006.01) |
| *C08L 23/16* | (2006.01) |
| *C08L 25/04* | (2006.01) |

(52) U.S. Cl.
CPC . *C08J 3/24* (2013.01); *C08J 3/22* (2013.01); *C08J 3/226* (2013.01); *C08L 23/06* (2013.01); *C08L 23/16* (2013.01); *C08L 25/04* (2013.01); *H01B 3/22* (2013.01); *H01B 3/28* (2013.01); *H01B 3/441* (2013.01); *H01B 3/442* (2013.01); *C08J 2323/16* (2013.01); *C08J 2325/04* (2013.01); *C08J 2423/06* (2013.01); *C08J 2423/12* (2013.01); *C08J 2423/16* (2013.01); *C08L 2201/08* (2013.01); *C08L 2203/202* (2013.01); *C08L 2310/00* (2013.01); *C08L 2312/08* (2013.01)

(58) Field of Classification Search
CPC ........ C08L 101/10; C08K 5/14; C08K 5/5425
See application file for complete search history.

(56) References Cited

U.S. PATENT DOCUMENTS

| | | | |
|---|---|---|---|
| 2010/0163272 A1 | 7/2010 | Inagaki et al. | |
| 2014/0227518 A1* | 8/2014 | Kishimoto | C08L 23/04 |
| | | | 428/394 |

FOREIGN PATENT DOCUMENTS

| | | |
|---|---|---|
| EP | 2927268 A1 | 10/2015 |
| JP | 2000-143935 A | 5/2000 |
| JP | 2000-315424 A | 11/2000 |
| JP | 2001-101928 A | 4/2001 |
| JP | 2001-240719 A | 9/2001 |
| JP | 2012-255077 A | 12/2012 |
| WO | WO 2012/136775 A1 | 10/2012 |
| WO | WO 2012/169298 A1 | 12/2012 |
| WO | WO 2013/147148 A1 | 10/2013 |
| WO | WO 2014/084048 A1 | 6/2014 |

OTHER PUBLICATIONS

International Search Report, issued in PCT/JP2014/075751, PCT/ISA/210, dated Dec. 9, 2014.
Extended European Search Report for European Application No. 14848771.3, dated Apr. 21, 2017.

* cited by examiner

*Primary Examiner* — Kuo Liang Peng
(74) *Attorney, Agent, or Firm* — Birch, Stewart, Kolasch & Birch, LLP

(57) ABSTRACT

A method comprising at least (a) a step of preparing a silane master batch by melt-kneading, to 100 parts by mass of a base resin ($R_B$) containing a non-aromatic organic oil and ethylene rubber, an organic peroxide of from 0.01 to 0.6 parts by mass, an inorganic filler of from 10 to 400 parts by mass, and a silane coupling agent of from 1 to 15.0 parts by mass, at a temperature equal to or higher than the decomposition temperature of the organic peroxide; a heat-resistant silane crosslinked resin molded body and a heat-resistant silane crosslinkable resin composition prepared by the method, and a silane master batch and a heat-resistant product.

13 Claims, No Drawings

HEAT-RESISTANT SILANE CROSSLINKED RESIN MOLDED BODY AND METHOD OF PRODUCING THE SAME, HEAT-RESISTANT SILANE CROSSLINKABLE RESIN COMPOSITION AND METHOD OF PRODUCING THE SAME, SILANE MASTER BATCH, AND HEAT-RESISTANT PRODUCT USING HEAT-RESISTANT SILANE CROSSLINKED RESIN MOLDED BODY

CROSS-REFERENCE TO RELATED APPLICATIONS

This application is a Continuation of PCT International Application No. PCT/JP2014/075751 filed on Sep. 26, 2014, which claims priority under 35 U.S.C. § 119 (a) to Japanese Patent Application No. 2013-202669 filed in Japan on Sep. 27, 2013. Each of the above applications is hereby expressly incorporated by reference, in its entirety, into the present application.

TECHNICAL FIELD

The present invention relates to a heat-resistant silane crosslinked resin molded body and a method of producing the same, a heat-resistant silane crosslinkable resin composition and a method of producing the same, a silane master batch, and a heat-resistant product using a heat-resistant silane crosslinked resin molded body.

More specifically, the present invention relates to a heat-resistant silane crosslinked resin molded body that is hard to collapse due to a load of external force, and is excellent in heat resistance, flexibility and appearance, and further preferably has excellent flame retardancy and mechanical characteristics, and a method of producing the same, a silane master batch and a heat-resistant silane crosslinkable resin composition, capable of being formed into the heat-resistant silane crosslinked resin molded body, and a method of producing the same, and a heat-resistant product in which the heat-resistant silane crosslinked resin molded body is used as an insulator, a sheath or the like of an electric wire.

BACKGROUND ART

Insulated wires, cables, cords, optical fiber core wires, used as inside or outside wiring for electric and electronic instruments, optical fiber cord and the like, are required to have various properties such as flame retardancy, heat resistance, and mechanical characteristics (for example, tensile properties and abrasion resistance).

As the materials for these wiring materials, use is made of resin compositions prepared by incorporating the metal hydrate such as magnesium hydroxide or aluminum hydroxide in large quantities.

In addition, the wiring materials having flexibility, such as a rubber electric wire and a rubber cabtyre cable are momentarily exposed to a temperature of 100° C. or higher in some cases, and heat resistance thereagainst is required. Further, various characteristics such as characteristics of causing no collapse even if pressure is applied from outside are required.

In order to satisfy such demands, a method of crosslinking covering materials by a chemical crosslinking method or the like is applied for the purpose of providing the wiring materials with high heat resistance and rubber elasticity.

So far, as a method of crosslinking a polyolefin resin such as polyethylene, or rubber such as ethylene-propylene rubber or chloroprene rubber, an electron beam crosslinking method of irradiating with electron beams to cause bridging (also referred to as crosslinking), a chemical crosslinking method of applying heat, after molding, to decompose organic peroxide or the like to allow a crosslinking reaction, and a silane crosslinking method have been known.

Among these crosslinking methods, because in most cases silane crosslinking methods do not particularly require special facilities, they can therefore be used in a wide variety of fields.

The silane crosslinking method is a method of obtaining a crosslinked molded body, by a grafting reaction of a silane coupling agent having an unsaturated group onto a polymer in the presence of organic peroxides, to obtain a silane graft polymer, and then contacting the silane graft polymer with water in the presence of a silanol condensation catalyst.

To give a concrete example, as a method of producing a halogen-free heat-resistant silane crosslinked resin, there is a method of melt-blending a silane master batch prepared by grafting a hydrolyzable silane coupling agent having an unsaturated group onto a polyolefin resin, a heat-resistant master batch prepared by kneading a polyolefin resin and an inorganic filler, and a catalyst master batch containing a silanol condensation catalyst. However, in this method, when the inorganic filler exceeds 100 parts by mass with respect to 100 parts by mass of the polyolefin resin, it becomes difficult to conduct uniform melt-kneading thereof in a single-screw extruder or a twin-screw extruder, after the silane master batch and the heat-resistant master batch are dry mixed. This causes problems such as deterioration of appearance, significant degeneration of physical properties, and difficulty of molding with high extrusion load.

Accordingly, in performing dry blending of the silane master batch with the heat-resistant master batch, and then uniformly melt-kneading them, a ratio of the inorganic filler is restricted, as mentioned above. Therefore, it has been difficult to achieve high flame retardancy and high heat resistance.

Generally, for the kneading in the case where the inorganic filler exceeds 100 parts by mass with respect to 100 parts by mass of polyolefin resin, an enclosed mixer such as a continuous kneader, a pressurized kneader, or a Banbury mixer is generally used.

In the meantime, when a silane grafting reaction is performed in a kneader or a Banbury mixer, the hydrolyzable silane coupling agent having an unsaturated group, which generally has high volatility, volatizes before grafting reaction. Therefore, it was very difficult to prepare a desired silane crosslinking master batch.

Therefore, in the case of preparing a heat-resistant silane master batch with a Banbury mixer or a kneader, consideration might be given to a method which includes adding organic peroxides and a silane coupling agent having a hydrolysable unsaturated group to the heat-resistant master batch prepared by melt-blending a polyolefin resin and an inorganic filler, and then subjecting the resultant to graft-reaction in a single-screw extruder.

However, according to such a method, defects in the appearance of molded body would sometimes occur due to uneven reaction. Further, the need to incorporate a very large amount of inorganic filler in the master batch would sometimes result in very high extrusion load. These make it very difficult to manufacture a molded body. As a result, it was difficult to obtain a desired material or molded body. In addition, the method involves two steps and therefore has a big problem in terms of cost.

In addition, even if the polyolefin resin, the rubber, or the like is crosslinked according to the above-described conventional process, the silane crosslinked body has a large portion of non-crosslinked parts to allow no incorporation of the inorganic filler thereinto in a large amount in some cases. Therefore, there has existed a problem in which no sufficient rubber elasticity can be provided thereto, and the silane crosslinked body easily collapses if an external force is loaded.

Patent Literature 1 proposes a method in which an inorganic filler surface-treated with a silane coupling agent, a silane coupling agent, an organic peroxide, and a crosslinking catalyst are thoroughly melt-kneaded with a kneader into a resin component formed by mixing a polyolefin-based resin and a maleic anhydride-based resin, and then the blend is molded with a single-screw extruder.

In addition, Patent Literatures 2 to 4 propose a method of partially crosslinking a vinyl aromatic thermoplastic elastomer composition prepared by adding a non-aromatic softener for rubber as a softener, to a block copolymer or the like as a base resin, through a silane surface-treated inorganic filler using organic peroxide.

Further, Patent Literature 5 proposes a method in which organic peroxide, a silane coupling agent, and a metal hydrate are melt-kneaded with a base material in batch, and further melt-molded together with a silanol condensation catalyst, and then crosslinked in the presence of water, to easily obtain a cable having heat resistance.

CITATION LIST

Patent Literatures

Patent Literature 1: JP-A-2001-101928 ("JP-A" means unexamined published Japanese patent application)
Patent Literature 2: JP-A-2000-143935
Patent Literature 3: JP-A-2000-315424
Patent Literature 4: JP-A-2001-240719
Patent Literature 5: JP-A-2012-255077

SUMMARY OF INVENTION

Technical Problem

However, according to the method described in Patent Literature 1, a resin is partially crosslinked during melt-kneading in a Banbury mixer or a kneader, and it is liable to cause poor appearance (formation of a number of granule-like matters protruded on a surface thereof) of a molded body to be obtained. Further, a greater part of silane coupling agent other than the silane coupling agents with which the inorganic filler is surface-treated, is liable to be volatilized or condensed. For this reason, the desired heat resistance cannot be obtained and, in addition, the appearance of electric wire can be degraded by condensation of the silane coupling agents.

In addition, even according to the methods proposed in Patent Literatures 2 to 4, since the resin still does not form a sufficient network, there is a problem in that the bond between the resin and inorganic filler is cleaved at a high temperature. Therefore, the molded body is melted at a high temperature, for example, an insulating material can be melted, during soldering of an electric wire. Further, there is a problem in that a molded body is deformed or generates foams at the time of secondary processing. Further, there is a problem in that the rubber elasticity is also insufficient, the molded body easily collapses if the external force is acted thereon, and the molded body is easily deformed at a high temperature.

In the method described in Patent Literature 5, upon performing extrusion molding of a silane crosslinkable flame-retardant polyolefin formed by batch melt-kneading, together with the silanol condensation catalyst, poor appearance due to appearance roughness and an aggregated substance (also referred to as an appearance aggregated substance) was easily generated. In particular, it has been confirmed that, if an extruder is once stopped upon cleaning the extruder, changing set-ups or adjusting decentering, the appearance roughness and the appearance aggregated substance are easily generated to cause the poor appearance in the molded body to be molded thereafter.

In addition, the molded body obtained by the method described in Patent Literature 5 has had a problem that the molded body easily collapses if pressure is applied thereto, the problem of the conventional chemical crosslinked rubber material cannot be solved, and the molded body cannot serve as a substitute thereof.

The present invention aims to overcome the problem of the conventional silane crosslinking method, and to provide a heat-resistant silane crosslinked resin molded body that is hard to collapse by the load of external force, and is excellent in heat resistance, flexibility and appearance, and further preferably has excellent flame retardancy and mechanical characteristics, and a method of producing the same.

In addition, the present invention aims to provide a silane master batch and a heat-resistant silane crosslinkable resin composition, capable of being formed into the heat-resistant silane crosslinked resin molded body, and a method of producing the resin composition.

Furthermore, the present invention aims to provide a heat-resistant product using a heat-resistant silane crosslinked resin molded body obtained by a method of producing a heat-resistant silane crosslinked resin molded body.

Solution to Problem

The above-described problems of the present invention can be solved by the following means.

(1) A method of producing a heat-resistant silane crosslinked resin molded body, comprising:

(a) a step of preparing a silane master batch by melt-kneading, to 100 parts by mass of a base resin ($R_B$) containing a non-aromatic organic oil and ethylene rubber, an organic peroxide of from 0.01 to 0.6 parts by mass, an inorganic filler of from 10 to 400 parts by mass, and a silane coupling agent of from 1 to 15.0 parts by mass, at a temperature equal to or higher than the decomposition temperature of the organic peroxide, (b) a step of obtaining a mixture by mixing the silane master batch and a silanol condensation catalyst, (c) a step of obtaining a molded body by molding the mixture, and (d) a step of obtaining a heat-resistant silane crosslinked resin molded body by contacting the molded body with water.

(2) The method of producing a heat-resistant silane crosslinked resin molded body described in the above item (1), wherein the base resin ($R_B$) contains a styrene-based elastomer.

(3) The method of producing a heat-resistant silane crosslinked resin molded body described in the above item (1) or (2), wherein the mixing amount of the silane coupling agent is more than 4 parts by mass and 15 parts by mass or less, with respect to 100 parts by mass of the base resin ($R_B$).

(4) The method of producing a heat-resistant silane crosslinked resin molded body described in any one of the above items (1) to (3), wherein the mixing amount of the silane coupling agent is 6 to 15.0 parts by mass, with respect to 100 parts by mass of the base resin ($R_B$).

(5) The method of producing a heat-resistant silane crosslinked resin molded body described in any one of the above items (1) to (4), wherein the silane coupling agent is vinyltrimethoxysilane or vinyltriethoxysilane.

(6) The method of producing a heat-resistant silane crosslinked resin molded body described in any one of the above items (1) to (5), wherein the inorganic filler is at least one selected from the group consisting of silica, aluminum hydroxide, magnesium hydroxide, calcium carbonate, and antimony trioxide.

(7) The method of producing a heat-resistant silane crosslinked resin molded body described in any one of the above items (1) to (6), wherein the melt-kneading at the step (a) is performed in an enclosed mixer.

(8) The method of producing a heat-resistant silane crosslinked resin molded body described in any one of the above items (1) to (7), wherein substantially no silanol condensation catalyst is mixed in the step (a).

(9) A method of producing a heat-resistant silane crosslinkable resin composition, comprising:

(a) a step of preparing a silane master batch by melt-kneading, to 100 parts by mass of a base resin ($R_B$) containing a non-aromatic organic oil and ethylene rubber, an organic peroxide of from 0.01 to 0.6 parts by mass, an inorganic filler of from 10 to 400 parts by mass, and a silane coupling agent of from 1 to 15.0 parts by mass, at a temperature equal to or higher than the decomposition temperature of the organic peroxide, and (b) a step of obtaining a mixture by mixing the silane master batch and a silanol condensation catalyst.

(10) A heat-resistant silane crosslinkable resin composition produced by the method described in the above item (9).

(11) A heat-resistant silane crosslinked resin molded body produced by the method described in any one of the above items (1) to (8).

(12) The heat-resistant silane crosslinked resin molded body described in the above item (11), wherein the heat-resistant silane crosslinked resin molded body contains a resin crosslinked with the inorganic filler through a silanol bond in the silane coupling agent.

(13) A heat-resistant product having the heat-resistant silane crosslinked resin molded body described in the above item (11) or (12).

(14) The heat-resistant product described in the above item (13), wherein the heat-resistant silane crosslinked resin molded body is provided as a coating for an electric wire or an optical fiber cable.

(15) A silane master batch, for use in a production of a heat-resistant silane crosslinkable resin composition formed by melt-mixing, to 100 parts by mass of a base resin ($R_B$) containing a non-aromatic organic oil and ethylene rubber, an organic peroxide of from 0.01 to 0.6 parts by mass, an inorganic filler of from 10 to 400 parts by mass, a silane coupling agent of from 1 to 15.0 parts by mass, and a silanol condensation catalyst, wherein all or part of the base resin ($R_B$), the organic peroxide, the inorganic filler, and the silane coupling agent are melt-mixed, at a temperature equal to or higher than the decomposition temperature of the organic peroxide.

In the present invention, "base resin ($R_B$)" means the resin for forming the heat-resistant silane crosslinked resin molded body or the heat-resistant silane crosslinkable resin composition.

In the present invention, "part of the base resin ($R_B$)" means a resin to be used in the step (a) in the base resin ($R_B$), and part of the base resin ($R_B$) itself (i.e. it has a composition same as the base resin ($R_B$)), part of resin components that constitute the base resin ($R_B$), and a resin component that constitutes the base resin ($R_B$) (for example, a total amount of a specific resin component among a plurality of resin components).

In addition, "remainder of the base resin ($R_B$)" means a remaining base resin excluding the part to be used in the step (a) in the base resin ($R_B$), and specifically, a remainder of the base resin ($R_B$) itself (i.e. it has a composition same as the base resin ($R_B$)), a remainder of the resin component that constitutes the base resin ($R_B$), and a remaining resin component that constitutes the base resin ($R_B$).

Note that, in this patent specification, numerical expressions in a style of " . . . to . . . " will be used to indicate a range including the lower and upper limits represented by the numerals given before and after "to", respectively.

Advantageous Effects of Invention

A production method of the present invention can overcome a problem of a conventional silane crosslinking method, and can effectively produce a heat-resistant silane crosslinked resin molded body that develops excellent rubber elasticity and characteristics of being hard to collapse by a load of external force, equivalent to or greater than a molded body obtained by a chemical crosslinking method, and a heat-resistant silane crosslinkable resin composition therefor. In addition, the present invention can improve extrusion appearance of the heat-resistant silane crosslinked resin molded body, and can also reduce generation of an aggregated substance. Furthermore, the present invention can impart excellent flame retardancy and mechanical characteristics to the heat-resistant silane crosslinked resin molded body.

In addition, according to the present invention, volatilization of a silane coupling agent during kneading can be suppressed by mixing inorganic filler and silane coupling agent before kneading and/or during kneading with a base resin. In addition, the heat-resistant silane crosslinked resin molded body that contains a large amount of the inorganic filler and is excellent in flexibility can be produced, without using a special machine such as a chemical crosslinking machine.

Accordingly, the present invention can overcome the problems of the conventional silane crosslinking method, and can provide the heat-resistant silane crosslinked resin molded body that is hard to collapse by the load of external force, and is excellent in heat resistance, flexibility and appearance, and further preferably has excellent flame retardancy and mechanical characteristics, and a method of producing the same. In addition, the present invention can provide the silane master batch, and the heat-resistant silane crosslinkable resin composition, capable of being formed into the heat-resistant silane crosslinked resin molded body, and a method of producing the same, and a heat-resistant product using the heat-resistant silane crosslinked resin molded body obtained by the method of producing the heat-resistant silane crosslinked resin molded body.

Other and further features and advantages of the invention will appear more fully from the following description.

MODE FOR CARRYING OUT THE INVENTION

The preferable embodiment of the present invention is described in detail below.

In both of the "method of producing a heat-resistant silane crosslinked resin molded body" of the present invention and the "method of producing a heat-resistant silane crosslinkable resin composition" of the present invention, at least, the above-described step (a) and step (b) are carried out.

Accordingly, the "method of producing a heat-resistant silane crosslinked resin molded body" of the present invention and the "method of producing a heat-resistant silane crosslinkable resin composition" of the present invention (in the description of parts common to both, the methods may be collectively referred to as a production method of the present invention in some cases) are collectively described below.

Step (a): Step of preparing a silane master batch by melt-kneading, to 100 parts by mass of a base resin ($R_B$) containing a non-aromatic organic oil and ethylene rubber, an organic peroxide of from 0.01 to 0.6 parts by mass, an inorganic filler of from 10 to 400 parts by mass, and a silane coupling agent of from 1 to 15.0 parts by mass, at a temperature equal to or higher than the decomposition temperature of the organic peroxide.

Step (b): Step of obtaining a mixture by mixing the silane master batch and a silanol condensation catalyst.

Step (c): Step of obtaining a molded body by molding the mixture.

Step (d): Step of obtaining a heat-resistant silane crosslinked resin molded body by contacting the molded body with water.

Here, "mixing" means an operation for obtaining a uniform mixture.

First, the components used in the present invention will be described.

<Base Resin ($R_B$)>

The base resin ($R_B$) to be used in the present invention at least contains a non-aromatic organic oil used as an oil component, and a resin component containing an ethylene rubber.

In this base resin ($R_B$), the content of each component is selected from the following ranges, so that the total amount of components would be 100 mass %.

(Non-Aromatic Organic Oil)

An organic oil is a mixed oil containing three oils: an oil composed of hydrocarbon having an aromatic ring, an oil composed of hydrocarbon having a naphthene ring, and an oil composed of hydrocarbon having a paraffin chain. An aromatic organic oil means one in which the number of carbon atoms that constitute the aromatic ring is 30% or more based on the total number of carbon atoms that constitute the aromatic ring, the naphthene ring and the paraffin chain. The non-aromatic organic oil to be used in the present invention means one in which the number of carbon atoms that constitute the aromatic ring is less than 30% based on the above-described total number of carbon atoms.

Specific examples of such a non-aromatic organic oil include a naphthene oil in which the number of carbon atoms that constitute a naphthene ring is from 30 to 40% based on the above-described total number of carbon atoms, and the number of carbon atoms that constitute a paraffin chain is less than 50% based on the above-described total number of carbon atoms, and a paraffin oil in which the number of carbon atoms that constitute a paraffin chain is 50% or more based on the above-described total number of carbon atoms. As the non-aromatic organic oil, a paraffin oil is preferable.

From a viewpoint of prevention of swelling under a high temperature, the non-aromatic organic oil has an aniline point of preferably 80° C. or higher, and further preferably 100° C. or higher. If the aniline point is 80° C. or higher, strength of the heat-resistant silane crosslinked resin molded body under a high temperature can be maintained. The aniline point is not particularly limited, but is preferably 160° C. or lower. The aniline point can be measured in accordance with JIS K 2256:1996.

In addition, kinematic viscosity (at 40° C.) of the non-aromatic organic oil is preferably from 30 to 400 mm$^2$/s. When the kinematic viscosity is too high, an effect of softening the resin can be minimized, or dispersion of the rubber material can be deteriorated in some cases. On the other hand, when the kinematic viscosity is too low, the oil can be easily volatilized during kneading or molding, or can be easily migrated from the molded body (generation of bloom). The kinematic viscosity can be measured in accordance with JIS K 2283.

Examples of the non-aromatic organic oil that can be used in the present invention include DIANA PROCESS OIL PW90, PW380 (trade names, manufactured by Idemitsu Kosan Co., Ltd.), COSMO NEUTRAL 500 (trade name, manufactured by COSMO OIL Co., Ltd.) and the like.

The content of the non-aromatic organic oil in the base resin ($R_B$) is not particularly limited, but is preferably from 0.1 to 2.5 times, further preferably from 0.3 to 2.0 times, and still further preferably from 0.5 to 1.5 times, in terms of a mass ratio, based on the total of ethylene rubber and a styrene-based elastomer as mentioned later. When the content of the non-aromatic organic oil is too low, an aggregated substance is easily generated upon stopping the extruder in some cases. On the other hand, when the content is too high, if the heat-resistant silane crosslinked resin molded body is allowed to stand for a long period of time, bloom of the non-aromatic organic oil is generated in some cases.

The content of the non-aromatic organic oil in the base resin ($R_B$) can be appropriately specified preferably in the range of satisfying the ratio of the above-described content. The content is, for example, preferably from 2 to 60 mass %, further preferably from 3 to 50 mass %, and still further preferably from 5 to 35 mass %.

(Ethylene Rubber)

The ethylene rubber to be used as the resin component in the present invention is not particularly limited, as long as the ethylene rubber is a rubber (including an elastomer) composed of a copolymer obtained by copolymerizing a compound having an ethylenically unsaturated bond, and a conventionally known one can also be used. Specific examples of the ethylene rubber preferably include a rubber composed of a copolymer of ethylene and α-olefin, and a rubber composed of a terpolymer of ethylene, α-olefin and diene. The diene constituent of the terpolymer may be a conjugated diene constituent or a non-conjugated diene constituent, and a non-conjugated diene constituent is preferable. In other words, specific examples of the terpolymer include a terpolymer of ethylene, α-olefin, and conjugated diene, and a terpolymer of ethylene, α-olefin, and non-conjugated diene; and a copolymer of ethylene and α-olefin, and a terpolymer of ethylene, α-olefin, and non-conjugated diene are preferable.

Preferred examples of the α-olefin constituent include those having 3 to 12 carbon atoms. Specific examples thereof include constituent s of propylene, 1-butene, 1-hexene, 4-methyl-1-pentene, 1-octene, 1-decene, 1-dodecene and the like. Examples of the conjugated diene constituent include butadiene, isoprene, 1,3-pentadiene, 2,3-dimethyl-1,3-butadiene and the like. Among them, butadiene is preferable as the conjugated diene constituent. Specific examples of the non-conjugated diene constituent include each constituent such as dicyclopentadiene (DCPD), ethylidene norbornene (ENB), and 1,4-hexadiene, and an ethylidene norbornene constituent is preferable.

Specific examples of the rubber composed of the copolymer of ethylene and α-olefin include ethylene-propylene rubber, ethylene-butene rubber, and ethylene-octene rubber. Specific examples of the rubber composed of the terpolymer of ethylene, α-olefin, and diene include ethylene-propylene-diene rubber and ethylene-butene-diene rubber.

Among them, ethylene-propylene rubber, ethylene-butene rubber, ethylene-propylene-diene rubber, and ethylene-butene-diene rubber are preferable, and ethylene-propylene rubber and ethylene-propylene-diene rubber are further preferable.

In the ethylene rubber, the amount of an ethylene constituent in the copolymer (referred to as an ethylene amount) is preferably 20 to 60 mass %, further preferably 25 to 55 mass %, and still further preferably 27 to 52 mass %. When the amount of ethylene is too small, flexibility or low temperature performance as rubber is poor in some cases. On the other hand, when the amount is too large, tackiness increases, and electric wires become hard to slip and adhere with each other in some cases.

As a method of measuring the ethylene amount, a value measured in accordance with the method described in ASTM D3900 is adopted.

The content of the ethylene rubber in the base resin ($R_B$) is not particularly limited, and is preferably from 5 to 95 mass %, further preferably 8 to 80 mass %, still further preferably from 10 to 60 mass %, and particularly preferably from 15 to 55 mass %. When the content of the ethylene rubber is too high, appearance is easily deteriorated when the extruder is stopped, and when the content is too low, no rubber elasticity is substantially developed, in some cases.

In addition, in the rubber composed of the terpolymer having the unsaturated bond such as the diene component, the content only needs to be within the above-described range, but the content in the base resin ($R_B$) is preferably 80 mass % or less, and further preferably 50 mass % or less. The lower limit is as described above.

The ethylene rubber only needs to satisfy the above-described content, but a ratio of the content of the non-aromatic organic oil to the content of the ethylene rubber (non-aromatic organic oil:ethylene rubber) is preferably from 3:1 to 0.1:1, further preferably from 2.5:1 to 0.3:1, and still further preferably from 1.5:1 to 0.3:1. If this ratio is within the above-described range, a state is formed in which the non-aromatic organic oil is substantially oil-added to the ethylene rubber, force of preventing moisture from being mixed becomes strong, and oil resistance is improved. In addition, bleed of the non-aromatic organic oil can be prevented even in long-term storage after molding.

(Resin Component Other than Ethylene Rubber)

The resin component other than the ethylene rubber to be used in the present invention is not particularly limited, as long as the resin component is a component having a crosslinking site on which a crosslinking reaction is performed with a crosslinking group of a silane coupling agent in the presence of organic peroxide, for example, an unsaturated bonding site in a carbon chain, or a carbon atom having a hydrogen atom in a main chain or at an end of the chain.

Specific examples of such a resin component include, other than the above-described ethylene rubber, a polyolefin resin (PO), a polyester resin, a polyamide resin (PA), a polystyrene resin (PS), and a polyol resin. Among them, a polyolefin resin is preferable.

This resin may be used singly alone, or be used by combining two or more kinds thereof.

The content of the polyolefin resin in the base resin ($R_B$) is not particularly limited, but is preferably from 20 to 95 mass %, and further preferably from 25 to 85 mass %. If the polyolefin resin is contained therein at this content, a consolidated network can be formed, and high heat resistance can be obtained.

The polyolefin resin as the resin component is not particularly limited, as long as the polyolefin resin is a resin composed of a polymer obtained by polymerizing or copolymerizing a compound having an ethylenically unsaturated bond. A conventionally known polyolefin resin that has been used so far for a heat-resistant resin composition can be used.

Specific examples of the polyolefin resin include a resin composed of a polymer such as polyethylene, polypropylene, ethylene-α-olefin copolymer, or polyolefin copolymer having an acid copolymerization component or acid ester copolymerization component, a rubber or elastomer (excluding ethylene rubber) of the polymer, and a styrene-based elastomer.

Among them, a resin composed of polyethylene, polypropylene, ethylene-α-olefin copolymer or polyolefin copolymer having an acid copolymerization component or acid ester copolymerization component, and a styrene-based elastomer are preferable. The reason is that accepting properties of various inorganic fillers including metal hydrate are high, and even if the inorganic fillers are incorporated thereinto in a large amount, mechanical strength can be maintained, and that reduction of withstand voltage, particularly withstand voltage characteristics at a high temperature can be suppressed while ensuring heat resistance.

The polyolefin based resin may be used singly alone, or be used by combining two or more kinds thereof.

The styrene-based elastomer means one composed of a polymer containing, as a constituent, an aromatic vinyl compound in its molecule. Accordingly, in the present invention, even if a polymer contains an ethylene constituent in the molecule, if the polymer contains an aromatic vinyl compound constituent, such a polymer is classified into the styrene-based elastomer.

Examples of the styrene-based elastomer may include a block copolymer of and a random copolymer of a conjugated diene compound with an aromatic vinyl compound, and a hydrogenated derivative thereof. Examples of the constituent of the aromatic vinyl compound may include styrene, p-(tert-butyl)styrene, α-methylstyrene, p-methylstyrene, divinylbenzene, 1,1-diphenylstyrene, N,N-diethyl-p-aminoethylstyrene, vinyltoluene, and the like. Among them, a styrene constituent is preferable. The constituent of the aromatic vinyl compound is used one kind alone, or is used by combining two or more kinds thereof. Specific examples of the constituent of the conjugated diene compound include one exemplified in Ethylene rubber, and among them, a butadiene constituent is preferable. The constituent of the conjugated diene compound is used one kind alone, or is used by combining two or more kinds thereof. In addition, as the styrene-based elastomer, an elastomer composed of a polymer obtained in the same manner and does not contain a styrene constituent but contains a constituent of an aromatic vinyl compound other than styrene may be used.

The styrene-based elastomer preferably has a content of the styrene constituent of 30% or more. When the styrene content is too low, oil resistance is reduced, or abrasion resistance is reduced, in some cases.

Specific examples of the styrene-based elastomers include a styrene-ethylene-butylene-styrene block copolymer (SEBS), a styrene-isoprene-styrene block copolymer (SIS), a hydrogenated SBS, a styrene-ethylene-ethylene-propylene-styrene block copolymer (SEEPS), a styrene-ethylene-propylene-styrene block copolymer (SEPS), a hydrogenated SIS, a hydrogenated styrene-butadiene rubber (HSBR), and a hydrogenated acrylonitrile-butadiene rubber (HNBR).

As the styrene-based elastomer, commercially available products can be used. Specific examples thereof include Septon 4077, Septon 4055, Septon 8105 (trade names, manufactured by Kuraray Co., Ltd.), Dynaron 1320P, Dynaron 4600P, 6200P, 8601P and 9901P (trade names, manufactured by JSR Corporation.), and the like.

The content of the styrene-based elastomer in the base resin ($R_B$) is not particularly limited, as long as the content is within the range of the content of the above-described polyolefin, and is preferably from 0 to 45 mass %, and further preferably from 5 to 40 mass %. When the content of the styrene-based elastomer is too high, heat resistance or long-term heat resistance is adversely affected in some cases.

The styrene-based elastomer only needs to satisfy the above-described content, but is preferably contained from 20 to 200 parts by mass, further preferably from 25 to 150 parts by mass, and still further preferably from 30 to 120 parts by mass, with respect to 100 parts by mass of ethylene rubber.

In addition, the content of the styrene-based elastomer only needs to satisfy the above-described content, but a ratio of the content of the non-aromatic organic oil to the content of the styrene-based elastomer (non-aromatic organic oil: styrene-based elastomer) is preferably from 2:1 to 0.1:1, further preferably from 1.5:1 to 0.2:1, and still further preferably from 1:1 to 0.3:1. If this ratio is within the above-described range, a state is formed in which the styrene-based elastomer is substantially oil-added by the non-aromatic organic oil, and mixing of moisture becomes hard, and oil resistance is improved. In addition, bleed of the non-aromatic organic oil can be prevented even in long-term storage after molding.

Polyethylene is not particularly limited, as long as the polyethylene is a polymer containing an ethylene component as the constituent. The polyethylene includes a homopolymer consisting of ethylene, a copolymer of ethylene and 5 mol % or less of α-olefin (excluding propylene), and a copolymer of ethylene and 1 mol % or less of non-olefin having a functional group containing carbon, oxygen, and hydrogen atoms only (for example, JIS K 6748). As the above-mentioned α-olefin and non-olefin, conventionally known ones that have been used so far as a copolymerization component for polyethylene can be used without any particular restriction.

Examples of the polyethylene that can be used in the present invention include a high-density polyethylene (HDPE), a low-density polyethylene (LDPE), an ultra-high-molecular-weight polyethylene (UHMW-PE), a linear low-density polyethylene (LLDPE), and a very-low-density polyethylene (VLDPE). Among them, a linear low-density polyethylene or a low-density polyethylene (LDPE) is preferable.

The polyethylene may be used singly alone, or be used by combining two or more kinds thereof.

Polypropylene is not particularly limited, as long as the polypropylene is a polymer containing propylene as the constituent. The polypropylene includes a propylene homopolymer, and also as a copolymer, an ethylene-propylene copolymer such as random polypropylene, and block polypropylene.

Here, "random polypropylene" means a copolymer of propylene and ethylene, in which the ethylene component content is 1 to 5 mass %. In addition, "block polypropylene" means a composition containing homopolypropylene and an ethylene-propylene copolymer, in which the ethylene component content is about 5 to 15 mass %, and the ethylene component and the propylene component exist as independent components.

The polypropylene may be used singly alone, or be used by combining two or more kinds thereof.

Specific examples of the ethylene-α-olefin copolymer preferably include a copolymer of ethylene and α-olefin having 3 to 12 carbon atoms (excluding those fall within polyethylene and polypropylene).

Specific examples of the α-olefin constituent in the ethylene-α-olefin copolymer include those exemplified in Ethylene rubber. The ethylene-α-olefin copolymer is preferably a copolymer of ethylene and α-olefin having 3 to 12 carbon atoms (excluding those fall within polyethylene and polypropylene), and specific examples thereof include an ethylene-propylene copolymer (excluding those fall within polypropylene), an ethylene-butylene copolymer, and an ethylene-α-olefin copolymer synthesized in the presence of a single site catalyst.

The ethylene-α-olefin copolymer may be used singly alone, or be used by combining two or more kinds thereof.

Specific examples of the acid copolymerization component or acid ester copolymerization component in the polyolefin copolymer having the acid copolymerization component or acid ester copolymerization component include a carboxylic acid compound such as (meth)acrylic acid and an acid ester compound such as vinyl acetate and alkyl (meth) acrylate. Here, an alkyl group of alkyl (meth)acrylate is preferably one having 1 to 12 carbon atoms, and specific examples thereof include a methyl group, an ethyl group, a propyl group, a butyl group and a hexyl group. Specific examples of the polyolefin copolymer having an acid copolymerization component or acid ester copolymerization component (excluding those fall within polyethylene) include an ethylene-vinyl acetate copolymer, an ethylene-(meth)acrylate copolymer, and an ethylene-alkyl (meth) acrylate copolymer. Among them, an ethylene-vinyl acetate copolymer, an ethylene-methyl acrylate copolymer, an ethylene-ethyl acrylate copolymer, and an ethylene-butyl acrylate copolymer are preferable; and in view of the accepting properties of the inorganic filler and the heat resistance, an ethylene-vinyl acetate copolymer and an ethylene-ethyl acrylate copolymer are further preferable.

The polyolefin copolymer having an acid copolymerization component or an acid ester copolymerization component is used singly alone, or is used by combining two or more kinds thereof.

The polyolefin resin, namely the above-described each polymer may be acid-modified. For example, as the styrene-based elastomer, one partially or wholly modified with an unsaturated carboxylic acid or one partially or wholly unmodified therewith can be used.

An acid to be used for acid modification is not particularly limited, but specific examples include an unsaturated carboxylic acid and a derivative thereof. Specific examples of the unsaturated carboxylic acid include maleic acid, itaconic acid and fumaric acid. Specific examples of the derivative of the unsaturated carboxylic acid may include maleic monoester, maleic diester, maleic anhydride, itaconic monoester, itaconic diester, itaconic anhydride, fumaric monoester, fumaric diester, and fumaric anhydride. Among them, maleic acid and maleic anhydride are preferable. The amount of acid modification is ordinarily about 0.1 to 7 mass % in one molecule of an acid-modified polyolefin resin.

The base resin may contain, in addition to the above-mentioned components, an additive as mentioned later, or a resin component other than the above-described resin component.

<Organic Peroxide>

The organic peroxide plays a role of generating a radical at least by thermal decomposition, to cause a grafting reaction of the silane coupling agent onto the resin component, as a catalyst. In particular, when the silane coupling agent contains an ethylenically unsaturated group, the organic peroxide play a role of causing the grafting reaction due to a radical reaction (including an abstraction reaction of a hydrogen radical from the resin component) between the ethylenically unsaturated group and the resin component.

The organic peroxide to be used in the present invention is not particularly limited, as long as the organic peroxide is one that generates a radical. For example, as the organic peroxide, the compound represented by the formula $R^1$—OO—$R^2$, $R^1$—OO—C(=O)$R^3$, or $R^4$C(=O)—OO(C=O)$R^5$ is preferable. Herein, $R^1$, $R^2$, $R^3$, $R^4$, and $R^5$ each independently represent an alkyl group, an aryl group, or an acyl group. Among them, in the present invention, it is preferable that all of $R^1$, $R^2$, $R^3$, $R^4$, and $R^5$ be an alkyl group, or any one of them be an alkyl group, and the rest be an acyl group.

Examples of such organic peroxide may include dicumyl peroxide (DCP), di-tert-butyl peroxide, 2,5-dimethyl-2,5-di-(tert-butyl peroxy)hexane, 2,5-dimethyl-2,5-di(tert-butyl peroxy)hexine-3, 1,3-bis(tert-butyl peroxyisopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxyisopropyl carbonate, diacetyl peroxide, lauroyl peroxide, tert-butylcumyl peroxide and the like. Among them, dicumyl peroxide (DCP), 2,5-dimethyl-2,5-di-(tert-butyl peroxy)hexane, or 2,5-dimethyl-2,5-di-(tert-butyl peroxy)hexine-3 is preferable, from the standpoint of odor, coloration, and scorch stability.

The decomposition temperature of the organic peroxide is preferably 80 to 195° C., and more preferably 125 to 180° C.

For the present invention, the decomposition temperature of the organic peroxide means the temperature, at which, when an organic peroxide having a single composition is heated, the organic peroxide itself causes a decomposition reaction and decomposes into two or more kinds of compounds at a certain temperature or temperature range. In specific, the decomposition temperature is a temperature at which heat absorption or exothermic reaction starts, when the organic peroxide is heated at room temperature in a heating rate of 5° C./min under a nitrogen gas atmosphere, by a thermal analysis such as a DSC method.

<Inorganic Filler>

In the present invention, the inorganic filler is not particularly limited as long as it has, on its surface, a site that can form a hydrogen bond or the like or a site that can be chemically linked by a covalent bond, with a reaction site such as a silanol group of a silane coupling agent. For the inorganic filler, examples of the site that can be chemically linked to the reaction site of the silane coupling agent may include an OH group (OH group of hydroxy group, of water molecule in hydrous substance or crystallized water, or of carboxyl group), amino group, a SH group, and the like.

As such an inorganic filler, use can be made of metal hydrate, such as a compound having a hydroxy group or crystallized water, for example, aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whisker, hydrated aluminum silicate, hydrated magnesium silicate, basic magnesium carbonate, and hydrotalcite; boron nitride, silica (crystalline silica, amorphous silica, and the like), carbon, clay, zinc oxide, tin oxide, titanium oxide, molybdenum oxide, antimony trioxide, a silicone compound, quartz, talc, zinc borate, white carbon, zinc borate, zinc hydroxystannate, or zinc stannate.

Among them, as the inorganic filler, at least one kind of silica, aluminum hydroxide, magnesium hydroxide, calcium carbonate, magnesium carbonate, zinc borate, zinc hydroxystannate, and antimony trioxide is preferable, and at least one kind selected from the group consisting of silica, aluminum hydroxide, magnesium hydroxide, calcium carbonate and antimony trioxide is further preferable.

The inorganic filler may be used singly alone, or in combination of two or more kinds thereof.

The inorganic filler has an average particle diameter of preferably 0.2 to 10 μm, more preferably 0.3 to 8 μm, further preferably 0.4 to 5 μm, and particularly preferably 0.4 to 3 μm. When the average particle diameter of the inorganic filler is too small, the inorganic fillers can cause secondary aggregation at the time of mixing with a silane coupling agent, and thus the appearance of a molded articles can be deteriorated or the aggregated substances can be generated. On the other hand, when the average particle diameter is too large, the appearance can be deteriorated, or the effect on maintaining the silane coupling agent can be reduced, thereby generating a problem in crosslinking. The average particle diameter is obtained by dispersing the inorganic filler in alcohol or water, and then measuring using an optical particle diameter measuring device such as a laser diffraction/scattering particle diameter distribution measuring device.

As the inorganic filler, an inorganic filler surface-treated with a silane coupling agent or the like can be used. Specific examples of silane-coupling-agent-surface-treated metal hydrate include KISUMA 5 L, KISUMA 5P (both trade names, magnesium hydroxide, manufactured by Kyowa Chemical Industry Co., Ltd. or the like) and aluminum hydroxide. The amount of surface treatment of the inorganic filler with a silane coupling agent is not particularly limited, but is 2 mass % or less, for example.

<Silane Coupling Agent>

The silane coupling agent to be used in the present invention only needs to have a group that can perform a grafting reaction onto a resin component in the presence of a radical, and a group that can be chemically bonded with inorganic filler, and preferably is a hydrolyzable silane coupling agent having a hydrolyzable group at an end. The silane coupling agent is further preferably one having, at an end, a group containing an amino group, a glycidyl group, or an ethylenically unsaturated group, and a group containing a hydrolyzable group; and still further preferably a silane coupling agent having a group containing an ethylenically unsaturated group, and a group containing a hydrolyzable group, at an end. The group containing an ethylenically unsaturated group is not particularly limited, and specific examples thereof include a vinyl group, an allyl group, a (meth)acryloyloxy group, a (meth)acryloyloxyalkylene group, and a p-styryl group. In addition, these silane coupling agents and a silane coupling agent having any other end group may be simultaneously used.

As such a silane coupling agent, for example, a compound represented by the following Formula (1) can be used.

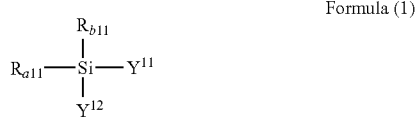

Formula (1)

In Formula (1), $R_{a11}$ represents a group having an ethylenically unsaturated group, $R_{b11}$ represents an aliphatic hydrocarbon group, a hydrogen atom, or $Y^{13}$. $Y^{11}$, $Y^{12}$, and $Y^{13}$ each represent a hydrolyzable organic group. $Y^{11}$, $Y^{12}$, and $Y^{13}$ may be the same or different from each other.

$R_{a11}$ of the silane coupling agent represented by Formula (1) is preferably a group having an ethylenically unsaturated group. The group having an ethylenically unsaturated group is as explained above, and is preferably a vinyl group.

$R_{b11}$ represents an aliphatic hydrocarbon group, a hydrogen atom, or $Y^{13}$ to be described below. Example of the aliphatic hydrocarbon group may include a monovalent aliphatic hydrocarbon group having 1 to 8 carbon atoms other than an aliphatic unsaturated hydrocarbon. $R_{b11}$ is preferably $Y^{13}$ to be described below.

$Y^{11}$, $Y^{12}$, and $Y^{13}$ each independently represent a hydrolyzable organic group, and examples thereof may include an alkoxy group having 1 to 6 carbon atoms, an aryloxy group having 6 to 10 carbon atoms, and an acyloxy group having 1 to 4 carbon atoms. Among them, an alkoxy group is preferable. Specific examples of the hydrolyzable organic group may include methoxy, ethoxy, butoxy, and acyloxy. Among them, from the standpoint of the reactivity of the silane coupling agent, methoxy or ethoxy is more preferable, and methoxy is particularly preferable.

As the silane coupling agent, a silane coupling agent that has high hydrolysis rate is preferable, and a silane coupling agent, in which $R_{b11}$ is $Y^{13}$ and also $Y^{11}$, $Y^{12}$, and $Y^{13}$ are the same each other, is more preferable. A hydrolyzable silane coupling agent in which at least one of $Y^{11}$, $Y^{12}$, and $Y^{13}$ is a methoxy group is further preferable, and a hydrolyzable silane coupling agent in which all of $Y^{11}$, $Y^{12}$, and $Y^{13}$ are methoxy groups is particularly preferable.

Specific examples of the silane coupling agent having a vinyl group, a (meth)acryloyloxy group or a (meth)acryloyloxyalkylene group at an end include organosilanes such as vinyltrimethoxysilane, vinyltriethoxysilane, vinyltributoxysilane, vinyldimethoxyethoxysilane, vinyldimethoxybutoxysilane, vinyldiethoxybutoxysilane, allyltrimethoxysilane, allyltriethoxysilane, vinyltriacetoxysilane; methacryloxypropyltrimethoxysilane, methacryloxypropyltriethoxysilane, and methacryloxypropylmethyldimethoxysilane. The silane coupling agent may be used singly alone, or two or more kinds thereof. Among these crosslinking silane coupling agents, a silane coupling agent having a vinyl group and an alkoxy group at an end thereof is more preferable, and vinyltrimethoxysilane and vinyltriethoxysilane are still more preferable.

Specific examples of one having a glycidyl group at an end include 3-glycidoxypropyltriethoxysilane, 3-glycidoxypropylmethyldiethoxysilane, 3-glycidoxypropyltrimethoxysilane, 3-glycidoxypropylmethyldimethoxysilane, and 2-(3,4-epoxycyclohexyl)ethyltrimethoxysilane.

The silane coupling agent may be used as it is, or may be diluted with a solvent and used.

<Silanol Condensation Catalyst>

The silanol condensation catalyst has an action of binding the silane coupling agents which have been grafted onto the resin component to each other, by a condensation reaction in the presence of water. Based on the action of the silanol condensation catalyst, the resin components are crosslinked between themselves through silane coupling agent. As a result, the heat-resistant silane crosslinked resin molded body having excellent heat resistance can be obtained.

As the silanol condensation catalyst to be used in the present invention, an organic tin compound, a metal soap, a platinum compound, and the like can be mentioned. General examples of the silanol condensation catalyst may include dibutyltin dilaurate, dioctyltin dilaurate, dibutyltin dioctylate, dibutyltin diacetate, zinc stearate, lead stearate, barium stearate, calcium stearate, sodium stearate, lead naphthenate, lead sulfate, zinc sulfate, an organic platinum compound, and the like. Among them, the organic tin compounds such as dibutyltin dilaurate, dioctyltin dilaurate, dibutyltin dioctylate, and dibutyltin diacetate are particularly preferable.

<Carrier Resin>

The silanol condensation catalyst to be used in the present invention is mixed with a resin, if desired. Such a resin (also referred to as a carrier resin) is not particularly limited, but a resin other than the base resin ($R_B$) or a part of the base resin ($R_B$) can be used. The part of the base resin ($R_B$) may be one or more component of the resin components that constitute the base resin ($R_B$), or a part of the whole resin components that constitute the base resin ($R_B$), but one or more component of the resin components that constitute the base resin ($R_B$) is preferable.

As the carrier resin, the polyolefin resin is preferable, and in view of good affinity with the silanol condensation catalyst and also of excellent heat resistance, a resin containing ethylene as a constituent is further preferable among the polyolefin, and polyethylene is particularly preferable.

<Additive>

To the heat-resistant silane crosslinked resin molded body and the heat-resistant silane crosslinkable resin composition, various additives which are generally used for electric wires, electric cables, electric cords, sheets, foams, tubes, and pipes, may be properly used in the range that does not adversely affect the purpose of the present invention. Examples of these additives include a crosslinking assistant, an antioxidant, a lubricant, a metal inactivator, a filler, and other resins.

These additives, particularly the antioxidant and the metal inactivator may be mixed with any of components, but may preferably be mixed with the carrier resin. It is preferable that the crosslinking assistant is not substantially contained. Especially, it is preferable that the crosslinking assistant be not substantially mixed in the step (a) of producing the silane master batch. If the crosslinking assistant is not substantially mixed, crosslinking of the resin components with each other during kneading hardly occurs, and the appearance and the heat resistance of the heat-resistant silane crosslinked resin molded body are excellent. Here, the term "is not substantially contained or is not substantially mixed" means that the crosslinking assistant is not actively added or mixed and it is not intended to exclude the crosslinking assistant which is inevitably contained or mixed.

The crosslinking assistant refers to one that forms a partial crosslinking structure with the resin component, in the presence of the organic peroxide. Examples thereof may include polyfunctional compounds, for example, a methacrylate compound such as polypropyleneglycol diacrylate and trimethylolpropane triacrylate, an allyl compound such as triallyl cyanurate, a maleimide compound, or a divinyl compound.

Examples of the antioxidant may include an amine-based antioxidant such as 4,4'-dioctyl-diphenylamine, N,N'-diphenyl-p-phenylenediamine, 2,2,4-trimethyl-1,2-dihydroquinoline polymer; a phenol-based antioxidant such as pentaerythritol-tetrakis(3-(3,5-di-tert-butyl-4-hydroxyphenyl) propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene, and a sulfur-based antioxidant such as bis(2-methyl-4-(3-n-alkylthiopropionyloxy)-5-tert-butylphenyl)sulfide, 2-mercaptobenzimidazole and zinc salts thereof, and pentaerythritol-tetrakis(3-laurylthiopropionate). An antioxidant is preferably included in a content of 0.1 to 15.0 parts by mass, and more preferably included in a content of 0.1 to 10 parts by mass, with respect to 100 parts by mass of the resin.

Examples of the lubricant may include hydrocarbon-based, siloxane-based, fatty-acid-based, fatty-acid-amide-based, ester-based, alcohol-based, or metal-soap-based lubricants. These lubricants are preferably added to the carrier resin.

Examples of the metal inactivator may include N,N'-bis (3-(3,5-di-tert-butyl-4-hydroxyphenyl)propionyl)hydrazine, 3-(N-salicyloyl)amino-1,2,4-triazole, and 2,2'-oxamidebis (ethyl-3-(3,5-di-tert-butyl-4-hydroxyphenyl)propionate).

As the filler (including a flame-retardant agent (assistant)), a filler other than the above-mentioned various fillers can be mentioned.

Next, the production method of the present invention is described below.

In the production method of the present invention, in the step (a), the organic peroxide of from 0.01 to 0.6 parts by mass, the inorganic filler of from 10 to 400 parts by mass, and the silane coupling agent of from 1 to 15.0 parts by mass are melt-kneaded to 100 parts by mass of the base resin ($R_B$) containing the non-aromatic organic oil and the ethylene rubber, at the decomposition temperature of the organic peroxide or higher. In this manner, the silane master batch is prepared.

In the production method of the present invention, the term "to 100 parts by mass of the base resin ($R_B$)" has a meaning including "an aspect in which all of the base resin ($R_B$) and other components are mixed in the step (a)" and "an aspect in which part of the base resin ($R_B$) and other components are mixed in the step (a), and the remainder of the base resin ($R_B$) is mixed in a step after the step (a)". Accordingly, in the production method of the present invention, 100 parts by mass of the base resin ($R_B$) only need to be contained in the "heat-resistant silane crosslinkable resin composition", and a mode of mixing the base resin ($R_B$) is not particularly limited. Specifically, the total amount of the base resin ($R_B$) may be used in the step (a), or a part thereof is used in the step (a) and the remainder may be used in the step (b) as a part or whole of the carrier resin. In other words, the base resin ($R_B$) may be mixed in both steps including the step (a) and the step (b).

When a part of the base resin ($R_B$) is incorporated in the step (b), the mixing amount of 100 parts by mass of the base resin ($R_B$) in the step (a) is the total amount of the base resin ($R_B$) to be mixed in the step (a) and the step (b).

Here, when the remainder of the base resin ($R_B$) is incorporated in the step (b), the base resin ($R_B$) is preferably incorporated from 80 to 99 parts by mass, and further preferably from 94 to 98 parts by mass in the step (a), and preferably incorporated from 1 to 20 parts by mass, and further preferably from 2 to 6 parts by mass in the step (b).

The mixing amount of the organic peroxide is within the range of 0.01 to 0.6 parts by mass, and preferably 0.1 to 0.5 parts by mass, with respect to 100 parts by mass of the base resin ($R_B$). When the mixing amount of the organic peroxide is too low, the crosslinking reaction cannot progress during crosslinking and the silane coupling agents can be condensed with each other, and heat resistance, mechanical strength, and reinforcement performance cannot be sufficiently obtained in some cases. On the other hand, when the mixing amount of the organic peroxide is too high, too many of the resin components can be directly crosslinked with each other by a side reaction, and thus aggregated substances can be generated. In other words, polymerization can be performed in a suitable range by adjusting the mixing amount of the organic peroxide within this range, and the composition that is excellent in extrusion performance can be obtained without generating aggregates (aggregated substances) resulting from a crosslinked gel or the like.

The mixing amount of the inorganic filler is from 10 to 400 parts by mass, preferably from 30 to 280 parts by mass, with respect to 100 parts by mass of the base resin ($R_B$). In the case where the mixing amount of the inorganic filler is too small, the grafting reaction of the silane coupling agent can be non-uniformly made, and thus the desired heat resistance cannot be obtained, or the appearance can be deteriorated due to the non-uniform reaction. On the other hand, in the case where the mixing amount is too large, since the load at the time of molding or kneading can become very high, a secondary molding can be difficult.

The mixing amount of the silane coupling agent is from 1 to 15.0 parts by mass, preferably more than 4 parts by mass and 15.0 parts by mass or less, and more preferably from 6 to 15.0 parts by mass, with respect to 100 parts by mass of the base resin ($R_B$).

When the mixing amount of the silane coupling agent is too low, the crosslinking reaction does not sufficiently progress, and excellent flame resistance cannot be developed in some cases. On the other hand, when the mixing amount is too high, the silane coupling agent cannot be wholly adsorbed on the surface of the inorganic filler, and the silane coupling agent can be volatilized during kneading, which is not economical. In addition, the silane coupling agent that is not adsorbed thereon can be condensed, and the aggregated substance or burning/scorch can be caused on the molded body, and the appearance can be deteriorated.

When the mixing amount of the silane coupling agent is more than 4.0 parts by mass and 15.0 parts by mass or less, the appearance is excellent. Details of a mechanism thereof are unknown yet, but are presumed as described below. Specifically, in the step (a), with regard to the reactions caused by organic peroxide decomposition at the time of silane grafting of the silane coupling agent onto the resin component, the grafting reaction having a high reaction rate among the grafting reactions between the silane coupling agents and the resin components, and the condensation reaction between the silane coupling agents become dominant. Accordingly, the crosslinking reaction between the resin components, particularly between the polyolefin resins, which causes appearance roughness or appearance aggregated substance, are not likely to occur. Thus, the crosslinking reaction between the resin components can be effectively suppressed depending on the mixing amount of the silane coupling agent. Thus, the appearance during molding is improved. In addition, the above-described defect caused by the crosslinking reaction between the resin components is minimized, and therefore it becomes difficult to cause poor appearance even if the extruder is stopped and then the operation is resumed. Thus, the silane crosslinked resin molded body having favorable appearance can be produced with suppressing the crosslinking reaction between the resin components.

Meanwhile, in the step (a), a large amount of the silane coupling agent is bonded or adsorbed on the inorganic filler and immobilized thereon. Accordingly, the condensation reaction between the silane coupling agents that are bonded or adsorbed on the inorganic filler is difficult to occur. In addition, the condensation reaction between free silane coupling agents that are not bonded or adsorbed on the inorganic filler is rarely caused either, and generation of the gel or aggregated substance caused by the condensation reaction between the free silane coupling agents can be suppressed.

Thus, it is considered that both of the crosslinking reaction between the resin components and the condensation reaction between the silane coupling agents can be suppressed by using a specific amount of the silane coupling agent, and the silane crosslinked resin molded body having clean appearance can be produced.

In the step (a), the kneading temperature at which the above-mentioned components are melt-blended is a temperature equal to or higher than the decomposition temperature of the organic peroxide, and preferably a temperature of the decomposition temperature of the organic peroxide +25° C. to 110° C. The decomposition temperature is preferably set after melting the resin component. In addition, the kneading conditions, such as a kneading time may be appropriately determined. If the kneading is performed at a temperature lower than the decomposition temperature of the organic peroxide, the grafting reaction of the silane coupling agent and the like reaction do not occur, and thus, a desired heat resistance cannot be obtained, and also the organic peroxide can react during the extrusion, and thus, molding into a desired shape cannot be conducted.

As a kneading method, a method that is generally used with rubber and plastic can be satisfactorily used, and a kneading device may be appropriately selected depending on the mixing amount of the inorganic filler. As a kneading device, a single-screw extruder, a twin-screw extruder, a roll, a Banbury mixer, or various kneaders may be used, and an enclosed mixer such as Banbury mixer or various kneaders is preferable from the standpoint of the dispersibility of the resin component and the stability of the crosslinking reaction.

In addition, when the inorganic filler is blended exceeding 100 parts by mass with respect to 100 parts by mass of the resin, the kneading is generally performed with a continuous kneader, a pressured kneader, or a Banbury mixer.

In the present invention, the phrase "melt-blending, to 100 parts by mass of the base resin ($R_B$), the organic peroxide of from 0.01 to 0.6 parts by mass; the inorganic filler of from 10 to 400 parts by mass, and the silane coupling agent of from 1 to 15.0 parts by mass" does not specify the mixing order at the time of the melt-mixing, but means that mixing may be made in any order. In other words, the mixing order in the step (a) is not particularly limited.

In addition, a method of mixing the base resin ($R_B$) is not particularly limited, either. For example, a base resin ($R_B$) that is premixed and prepared may be used, or each component, for example, the resin component and the oil component may be separately used, respectively.

In the step (1), for example, the base resin ($R_B$), the organic peroxide, the inorganic filler, and the silane coupling agent can be melt-mixed at one time.

It is preferable that the silane coupling agent be not introduced alone into the silane master batch, but be premixed with the inorganic filler, or the like, and then introduced therein. In this manner, it makes it difficult for the silane coupling agent to volatize during kneading, and it is possible to prevent the condensation among the silane coupling agents that are not adsorbed on the inorganic filler. Accordingly, excellent appearance can be obtained. In addition, it can be prevented that melt-kneading in the step (a) become difficult. Further, a desired shape can also be obtained upon extrusion molding.

As such a mixing method, preferred is a method of mixing or dispersing an organic peroxide, an inorganic filler, and a silane coupling agent, at a temperature less than the decomposition temperature of the organic peroxide by using a mixer-type kneader such as a Banbury mixer and a kneader, and then melt-mixing the resultant mixture with the base resin ($R_B$). In this manner, an excessive crosslinking reaction between the resin components can be prevented, and excellent appearance can be obtained.

The inorganic filler, the silane coupling agent, and the organic peroxide are mixed at a temperature less than the decomposition temperature of the organic peroxide, and preferably at room temperature (25° C.). A method of mixing the inorganic filler, the silane coupling agent, and the organic peroxide is not particularly limited, and the organic peroxide may be simultaneously mixed with the inorganic filler or the like, or may also be mixed in any of stages of mixing the silane coupling agent with the inorganic filler. Specific examples of the method of mixing the inorganic filler, the silane coupling agent, and the organic peroxide include mixing methods such as wet treatment and dry treatment.

Specific examples of the method of mixing the silane coupling agent with the inorganic filler include a wet treatment in which the silane coupling agent is added to the inorganic filler being in a state dispersed in a solvent such as alcohol and water; a dry treatment in which both are added and mixed under heating or non-heating; and both of these methods. In the present invention, a dry treatment is preferable in which the silane coupling agent is added to the inorganic filler, preferably a dried inorganic filler, and mixed under heating or non-heating.

In the above-mentioned wet mixing, it becomes easy for the silane coupling agent to form a strong chemical bond with the inorganic filler, and therefore a subsequent silanol condensation reaction is less likely to proceed sometimes. On the other hand, in the dry mixing, bonding of the silane coupling agent and the inorganic filler is comparatively weak, and therefore it becomes easy for the silanol condensation reaction to progress effectively.

The silane coupling agent, added to the inorganic filler, is present surrounding the surface of the inorganic filler; and a part or whole thereof may be absorbed onto the inorganic filler or may be chemically bonded to the surface of the inorganic filler. In this state, it makes it possible to significantly suppress the volatilization of the silane coupling agent during kneading with a kneader or a Banbury mixer. In addition, it is considered that the unsaturated group of the silane coupling agent is reacted with the resin component by the added organic peroxide. Further, it is considered that during molding, the silane coupling agents are condensed by the silanol condensation catalyst. The mechanism of this reaction is unknown, but it is considered that, at the time of the condensation reaction, when bonding of the silane coupling agent with the inorganic filler is too strong, the silane coupling agent bonded with the inorganic filler is not freed therefrom even if the silanol condensation catalyst is added thereto, and it becomes difficult for the silanol condensation reaction (crosslinking reaction) to progress.

In the step (a), the organic peroxide may be dispersed into the inorganic filler after being mixed with the silane coupling agent, or may be separately dispersed into the inorganic filler separated from the silane coupling agent. In the present invention, it is preferable that the organic peroxide and the silane coupling agent be substantially simultaneously mixed.

In the present invention, only the silane coupling agent may be mixed with the inorganic filler, and subsequently the organic peroxide may be added thereto, depending on production conditions. In other words, in the step (a), inorganic filler preliminarily mixed with the silane coupling agent can be used. As a method of adding the organic peroxide thereto, one in which the peroxide is dispersed into other components, or the peroxide alone may be added thereto; the peroxide may be dispersed into oil and then added thereto; and preferably the peroxide is dispersed into resin and then added thereto.

In a preferable mixing method, subsequently, the mixture of the inorganic filler, the silane coupling agent, and the organic peroxide is melt-kneaded with the base resin ($R_B$), while performing heating at a temperature equal to or higher than the decomposition temperature of the organic peroxide, to prepare a silane master batch.

In the step (a), no silanol condensation catalyst is used. In other words, in the step (a), the above-mentioned each component is kneaded without substantially mixing the silanol condensation catalyst. Thus, melt-mixing is easily conducted without causing condensation of the silane coupling agents, and a desired shape can be obtained at the time of extrusion molding. Here, the term "without substantially mixing" means that the silanol condensation catalyst unavoidably existing therein is not excluded, and may exist at a degree at which the above-mentioned problem due to silanol condensation of the silane coupling agent is not caused. For example, in the step (a), the silanol condensation catalyst may exist when the content is 0.01 parts by mass or less, with respect to 100 parts by mass of the base resin ($R_B$).

As described above, the step (a) is carried out, and the silane master batch is prepared.

The silane master batch (also referred to as a silane MB) to be prepared in the step (a) is used for producing a mixture (heat-resistant silane crosslinkable resin composition) to be prepared in the step (b), as mentioned later, preferably with the silanol condensation catalyst or a catalyst master batch as mentioned later. This silane MB is a mixture to be prepared by melt-mixing the above-described components according to the step (a).

The silane master batch prepared in the step (a) contains a decomposed product of the organic peroxide, a reaction mixture of the resin component, the inorganic filler and the silane coupling agent, and the non-aromatic organic oil, and contains two kinds of the silane crosslinkable resins (silane grafted polymers) in which the silane coupling agents are grafted onto the resin components at a degree at which molding can be made in the step (b) mentioned later.

In the production method of the present invention, subsequently, the step (b) of obtaining a mixture by mixing the silane master batch and the silanol condensation catalyst is carried out.

As the mixing method, any mixing method may be applied, as long as a uniform mixture can be obtained as mentioned above. For example, pellets may be blended with each other at ordinary temperature or a high temperature, such as dry blend, and then placed in a molding machine, or the pellets may be blended, and then melt-mixed, re-pelletized, and then placed in a molding machine.

In any mode of mixing, in order to avoid the silanol condensation reaction, it is preferable that the silane master batch and the silanol condensation catalyst are not kept in a high temperature state for a long period of time in the state of being mixed. The mixture to be obtained is taken as a mixture in which at least moldability in molding in the step (c) is kept.

In the step (b), it is preferable that the silanol condensation catalyst is used together with the carrier resin. In other words, the step (b) only needs to be a step of mixing the silane master batch and the silanol condensation catalyst, and is preferably a step of melt-mixing of the catalyst master batch containing the silanol condensation catalyst and the carrier resin, and the silane master batch. Accordingly, in carrying out the step (b), the carrier resin and the silanol condensation catalyst are preferably melt-mixed to prepare the catalyst master batch.

A mixing ratio of the carrier resin and the silanol condensation catalyst in the catalyst master batch is set so as to satisfy a mixing ratio of with the resin of the silane master batch in the step (b).

Mixing of the silanol condensation catalyst with the carrier resin is appropriately determined according to a melting temperature of the resin component or the carrier resin. The blending may be performed, for example, at a kneading temperature of preferably from 80 to 250° C., and more preferably from 100 to 240° C. In addition, kneading conditions such as a kneading time may be appropriately set. The kneading method can be carried out according to a method similar to the above-described kneading method.

The thus prepared catalyst master batch is a mixture of the silanol condensation catalyst and the carrier resin, and the filler to be added if desired.

This catalyst master batch (also referred to as a catalyst MB) is used, together with the silane MB, for production of the heat-resistant silane crosslinkable resin composition to be prepared in the step (b).

In the step (b), the amount of incorporating the silanol condensation catalyst is preferably from 0.0001 to 0.5 parts by mass, and further preferably from 0.001 to 0.1 parts by mass, with respect to 100 parts by mass of the base resin ($R_B$). When the mixing amount of the silanol condensation catalyst is within the above-mentioned range, the crosslinking reaction by the condensation reaction of the silane coupling agent easily progresses substantially uniformly, and heat resistance, appearance, and physical properties of the heat-resistant silane crosslinked resin molded body are excellent, and productivity is also improved.

When the catalyst master batch is mixed therewith, the amount of incorporating the carrier resin is, in the case where the carrier resin is a resin other than the base resin ($R_B$), preferably from 1 to 60 parts by mass, further preferably from 2 to 50 parts by mass, and still further preferably from 2 to 40 parts by mass, with respect to 100 parts by mass of the base resin ($R_B$).

In addition, the inorganic filler may be added or may not be added to the carrier resin. The amount of the inorganic filler on the above occasion is not particularly limited, but is preferably 350 parts by mass or less with respect to 100 parts by mass of the carrier resin. The reason is that, when the filler amount is too large, it becomes difficult for the silanol condensation catalyst to disperse, and it becomes difficult for crosslinking thereof to progress. On the other hand, when the carrier resin is too much, a degree of crosslinking in the molded body is reduced, and there is a possibility that proper heat resistance cannot be obtained.

In the step (b), mixing conditions of the silane master batch with the silanol condensation catalyst or the catalyst master batch are appropriately selected. In other words, when the silanol condensation catalyst alone is mixed with the silane master batch, the mixing conditions are set to appropriate melt-mixing conditions according to the resin component.

On the other hand, when the catalyst master batch containing the silanol condensation catalyst is mixed with the silane master batch, melt-mixing is preferable in view of dispersion of the silanol condensation catalyst, and is basically similar to the melt-mixing in the step (a). There are resin components whose melting points cannot be measured by DSC or the like, elastomers for example, but kneading is performed at a temperature at which at least any of the resin component and the organic peroxide melts. The melting temperature is appropriately selected according to the melting temperature of the carrier resin, and it is preferably from 80 to 250° C., and more preferably from 100 to 240° C. In addition, the kneading conditions such as a kneading time may be appropriately set.

As described above, the step (a) and the step (b) of the present invention, in other words, the method of producing a heat-resistant silane crosslinkable resin composition of the present invention, is carried out, and as mentioned later, a heat-resistant silane crosslinkable resin composition containing at least two kinds of silane crosslinkable resins in which the crosslinking methods are different, is produced. Accordingly, the heat-resistant silane crosslinkable resin composition of the present invention is a composition obtained by carrying out the step (a) and the step (b), and is considered as an admixture of the silane master batch and either the silanol condensation catalyst or the catalyst master batch. The components are basically the same with the silane master batch and the silanol condensation catalyst or the catalyst master batch.

As described above, the silane MB, and the silanol condensation catalyst or the catalyst master batch can be used as a batch set for producing a heat-resistant silane crosslinkable resin composition.

In the method of producing a heat-resistant silane crosslinked resin molded body of the present invention, subsequently, the step (c) and (d) are carried out. In other words, in the method of producing a heat-resistant silane crosslinked resin molded body of the present invention, the step (c) of obtaining a molded body by molding the mixture thus obtained, namely, the heat-resistant silane crosslinkable resin composition of the present invention, is performed. The step (c) only has to mold the mixture, and the molding method and molding conditions can be appropriately selected depending on the form of the heat-resistant product of the present invention. For example, extrusion molding or the like is selected in a case where the heat-resistant product of the present invention is an electric wire or an optical fiber cable.

In the step (c), in the case where the mixing amount of the silane coupling agent exceeds 4 parts by mass with respect to 100 parts by mass of the base resin ($R_B$), it is possible to resume the operation of an extruder after the operation of the extruder is once stopped due to an event such as cleaning of the extruder, changing of set-ups or adjusting of decentering, without any problems.

In addition, the step (c) can be carried out simultaneously or continuously with the step (b). For example, a series of steps can be employed in which the silane master batch and either the silanol catalyst or the catalyst master batch are melt-kneaded in a coating device, and subsequently, for example, extruded and coated on an electric wire or fiber, and molded into a desired shape.

As described above, the heat-resistant silane crosslinkable resin composition of the present invention is molded, but the molded body of the heat-resistant silane crosslinkable resin composition to be obtained in the step (a) to the step (c) is a non-crosslinked body. Accordingly, a heat-resistant silane crosslinked resin molded body of the present invention is a crosslinked or finally crosslinked molded body formed by carrying out the following step (d) after the step (c).

In the method of producing the heat-resistant silane crosslinked resin molded body of the present invention, a step is carried out in which the molded body (non-crosslinked body) obtained in the step (c) is contacted with water. Thus, the hydrolyzable group of the silane coupling agent is hydrolyzed into silanol, hydroxyl groups in the silanol are condensed with each other by the silanol condensation catalyst existing in the resin, and the crosslinking reaction occurs, and the heat-resistant silane crosslinked resin molded body in which the molded body is crosslinked can be obtained. The treatment itself in this step (d) can be carried out according to an ordinary method. The hydrolyzable groups in the silane coupling agent are hydrolyzed by contacting moisture with the molded body, and the silane coupling agents are condensed with each other to form a crosslinked structure.

The condensation reaction between the silane coupling agents progresses just in storage at ordinary temperature. Accordingly, in the step (d), it is unnecessary to positively bring the molded body (non-crosslinked body) with water. In order to further accelerate crosslinking, the molded body can also be contacted with moisture. For example, the method of positively contacting the molded body with water can be employed, such as immersion into warm water, placement in a wet heat bath, and exposure to high temperature water vapor. In addition, pressure may be applied in order to penetrate moisture thereinto on the above occasion.

As described above, the method of producing the heat-resistant silane crosslinked resin molded body of the present invention is carried out, and the heat-resistant silane crosslinked resin molded body is produced from the heat-resistant silane crosslinkable resin composition of the present invention. Accordingly, the heat-resistant silane crosslinked resin molded body of the present invention is a molded body obtained by carrying out the step (a) to the step (d). Then, the molded body contains the resin component crosslinked with the inorganic filler through a silanol bond, as mentioned later.

Details of a reaction mechanism in the production method of the present invention are unknown yet, but it is considered as described below. Specifically, when the resin component is heat-kneaded with the inorganic filler and the silane coupling agent, in the presence of the organic peroxide component, at a temperature equal to or higher than the decomposition temperature of the organic peroxide, the organic peroxide is decomposed to generate radical, and grafting onto the resin component is caused by the silane coupling agent. In addition, a reaction of forming a chemical bond due to covalent bonding of the silane coupling agent with the group such as the hydroxyl group on the surface of the inorganic filler also partially occurs by heating on the above occasion.

In the present invention, the final crosslinking reaction is performed in the step (d), and owing thereto, when the silane coupling agent is incorporated into the resin in a specific amount as mentioned above, the inorganic filer can be incorporated thereinto in a large amount without adversely affecting extrusion processability during molding, and the molded body can simultaneously have the heat resistance, the mechanical characteristics and the like while ensuring the excellent flame retardancy.

In addition, a mechanism of operation in the above-described process of the present invention is unknown yet, but it is assumed as described below. Specifically, by using the inorganic filler and the silane coupling agent before kneading and/or during kneading with the base resin, the silane coupling agent is bonded with the inorganic filler by means of the alkoxy group and is bonded with a non-crosslinked part in the resin component by means of the ethylenically unsaturated group, such as vinyl group, existing at another end, or is physically and chemically adsorbed onto pores or the surface of the inorganic filler, and kept thereon, without being bonded with the inorganic filler. Thus, the present invention can form a silane coupling agent bonded with the inorganic filler by strong bonding (as the reason therefor, for example, formation of chemical bond with hydroxyl group or the like on the surface of the inorganic filler is considered), and a silane coupling agent bonded therewith by weak bonding (as the reason therefor, for example, interaction due to hydrogen bond, interaction between ions, partial electric charges or dipoles, action due to adsorption, or the like is considered). In this state, if the organic peroxide is added thereto and kneading is performed, at least two kinds of silane crosslinkable resins are formed in which the silane coupling agents having different bondings with the inorganic filler are graft reacted onto the resin component, without hardly causing volatilization of the silane coupling agent, as mentioned later.

By the above kneading, among the silane coupling agents, the silane coupling agent having strong bonding with the inorganic filler keeps the bonding with the inorganic filler, and the crosslinkable group such as ethylenically unsaturated group is subjected to the grafting reaction onto a crosslinkable site in the resin component. In particular, when a plurality of the silane coupling agents are bonded on the surface of one inorganic filler particle through strong bonding, a plurality of the resin components are bonded through the inorganic filler particle. By these reactions or bondings, a crosslinked network through the inorganic filler spreads. In other words, a silane crosslinkable resin is formed in which the silane coupling agents bonded with the inorganic filler is graft reacted onto the resin component.

In the case of the silane coupling agent having strong bonding with the inorganic filler, the condensation reaction due to silanol condensation catalyst in the presence of water hardly occurs, and bonding with the inorganic filler is kept. Thus, the bonding of the inorganic filler with the resin component is formed, and crosslinking of the resin components through the silane coupling agent is caused. By this, adhesion between the resin component and the inorganic filler is consolidated, and the molded body that is excellent in mechanical strength and abrasion resistance and hard to be scratched is obtained.

On the other hand, among the silane coupling agents, the silane coupling agent having weak bonding with the inorganic filler is released from the surface of the inorganic filler, and the crosslinkable group of the silane coupling agent, such as the ethylenically unsaturated group or the like, reacts with the radical of the resin component as generated by hydrogen radical abstraction caused by the radical generated by decomposition of the organic peroxide, and the grafting reaction occurs. In other words, the silane crosslinkable resin is formed in which the silane coupling agent released from the inorganic filler is graft reacted onto the resin component. The silane coupling agent in the thus-formed grafted part is mixed with the silanol condensation catalyst afterward, and contacted with moisture to cause the condensation reaction (crosslinking reaction).

In particular, in the present invention, the crosslinking reaction due to the condensation reaction using the silanol condensation catalyst in the presence of water in the step (d) is performed after the molded body is formed. Thus, workability in the steps up to forming the molded body is superb, and higher heat resistance than ever before can be obtained, in comparison with a conventional method that forms a molded body after the final crosslinking reaction. In addition, a plurality of the silane coupling agents can be bonded on the surface of one inorganic filler particle, and high mechanical strength can be obtained.

As described above, when the silane crosslinkable resin formed by grafting reaction of the silane coupling agent bonded with the inorganic filler by strong bonding onto the resin component, is contacted with moisture, a silane crosslinked resin crosslinked with the inorganic filler through the silanol bond in the silane coupling agent. It is considered that the silane coupling agent bonded with the inorganic filler by strong bonding contributes to high mechanical characteristics, and depending on circumstances, to abrasion resistance, scratch resistance, and the like.

On the above occasion, when the crosslinkable resin formed by bonding the ethylene rubber with the inorganic filler is contacted with moisture, a silane crosslinkable resin molded body that develops high rubber elasticity and is hard to collapse can be obtained. In particular, ethylene rubber has higher reactivity than other resins, for example, a polyolefin resin. Therefore, it is considered that the silane coupling agent bonded with the inorganic filler by strong bonding is selectively subjected to the grafting reaction onto the ethylene rubber. In this manner, it is considered that a crosslinked rubber molded network bonded with the inorganic filler is formed, and the silane crosslinkable resin molded body is obtained that has high heat resistance, reinforcement properties and the like and is hard to collapse.

In addition, when the silane crosslinkable resin formed by grafting reaction of the silane coupling agent bonded with the inorganic filler by weak bonding onto the resin component, is contacted with moisture, a silane crosslinked resin is formed in which the resin components are crosslinked with each other through the silanol bond in the silane coupling agent. It is considered that the silane coupling agent bonded with the inorganic filler by weak bonding contributes to improvement of a degree of crosslinking, in other words, improvement of the heat resistance.

Incidentally, when the organic peroxide is added thereto and the resultant mixture is heat-mixed, side reactions, for example, a reaction between the resin components and a reaction between the silane coupling agents, can be caused, in addition to the reaction of the resin component with the silane coupling reaction. If such side reactions are caused, poor appearance is caused in the silane crosslinkable resin molded body to be obtained, and when the extruder is stopped, the appearance is significantly adversely affected, and further the aggregated substance is generated in some cases.

In contrast, in the present invention in which the step (a) is carried out with using the base resin ($R_B$) containing ethylene rubber, the ethylene rubber has higher reactivity in comparison with the polyolefin resin component, and easily reacts by the organic peroxide, or the like. Thus, the side reactions are easily concentrated onto the ethylene rubber. Then, the reaction between the resin components and the side reactions between the silane coupling agents are suppressed, and the ethylene rubber is formed into a dynamic crosslinked state. By forming the ethylene rubber into the dynamic crosslinked state as described above, a bridged state in the ethylene rubber can be uniformized, and the above-described side reactions can be suppressed. As a result, the aggregated substances or the poor appearance becomes hard to be caused in the heat-resistant silane crosslinked resin molded body. Further, it is considered that, when the non-aromatic organic oil is contained therein, the resin component and the ethylene rubber are compatibilized, and the rubber is further micro-dispersed thereinto, and therefore the appearance becomes favorable.

It is considered that, when the base resin ($R_B$) contains a styrene-based elastomer, this styrene-based elastomer also has high reactivity, and contributes to improvement of the appearance together with the ethylene rubber.

Furthermore, in the present invention, when more than 4.0 parts by mass and 15.0 parts by mass or less of the silane coupling agent are mixed with the inorganic filler, as mentioned above, the crosslinking reaction between the resin components during melt-kneading in the step (a) can be effectively suppressed. In addition, the silane coupling agent is bonded with the inorganic filler, and is hard to volatilize even during melt-kneading in the step (a), and the reaction between the free silane coupling agents can also be effectively suppressed. Accordingly, it is considered that, even if the extruder is stopped and then the operation is resumed, it is hard to cause poor appearance, and a silane crosslinked resin molded body having a favorable appearance can be produced with sufficient moldability.

Here, the term "once stopped and then the operation is resumed" means, although conditions are influenced by the composition of the base resin ($R_B$), processing conditions or the like, and cannot be unequivocally mentioned, for example, the extruder can be stopped for up to 5 minutes, preferably up to 10 minutes, and further preferably up to 15 minutes in terms of an interval. Temperature at this time is not particularly limited, as long as it is a temperature at which the resin component is softened or melted, and is 200° C., for example.

The production method of the present invention is applicable to a production of a component part of or a member of a product (including a semi-finished product, a part and a member), such as a product requiring heat resistance or flame retardancy, a product requiring strength, and a product using a rubber material. Specific examples of such a heat-resistant product or a flame-retardant product include an electric wire such as a heat-resistant flame-retardant insulated wire, a heat-resistant flame-retardant cable coating material, a rubber substitute wire and cable material, other heat-resistant flame-retardant wire parts, a flame-retardant heat-resistant sheet, and a flame-retardant heat-resistant film. In addition, the production method is applicable to production of a power supply plug, a connector, a sleeve, a box, a tape-base material, a tube, a sheet, a packing, a cushion material, a seismic isolating material, a wiring material used in internal and external wiring for electric and electronic instruments, and particularly an electric wire or an optical fiber cable. Among the above described component or the like of product, the production method of the present invention is particularly preferably applied to production of an insulator, a sheath, or the like of electric wire and optical cable, and it can be formed as a coating thereof.

The insulator, the sheath or the like can be molded into a shape thereof by, for example, coating while melt-kneading is performed in an extrusion coating device. These molded articles such as insulators or sheaths may be produced by extrusion-coating the high heat-resistant crosslinking composition that does not melt at a high temperature and is added with the inorganic fillers in a large amount, around a conductor or around a conductor that is prepared by attaching tensile strength fiber in a length or entwisting, using an extrusion coating device that is widely used, without using a specific instrument such as an electron beam crosslinking instrument. For example, as a conductor, any one such as single-conductor or twisted-conductor of a soft copper may be used. In addition, as a conductor, in addition to a naked conductor, a tin-coated conductor or a conductor having an enamel-coated insulating layer may be used. The thickness of the insulating layer formed around the conductor (a coating layer formed of the heat-resistant resin composition of the present invention) is not particularly limited, and generally about 0.15 to 5 mm.

EXAMPLES

The present invention is described in more detail based on examples given below, but the present invention is not limited by the following examples. In addition, in Tables 1 and 2, the numerical values for incorporated amounts of the respective Examples and Comparative Examples are in terms of part by mass.

Examples 1 to 18 and Comparative Examples 1 to 6 were carried out by using the components shown in Table 1 and Table 2, and changing specifications or manufacturing conditions or the like, respectively, and the results of evaluation as mentioned later were collectively shown.

The compound described below was used as each component shown in Tables 1 and 2.

<Base Resin ($R_B$)>

(1) Oil Component

As the non-aromatic organic oil, the following was used.

"DIANA PROCESS PW90" (trade name, manufactured by IDEMITSU KOSAN Co., Ltd., paraffin oil, aniline point: 127.7° C., kinematic viscosity: 92 mm$^2$/s (40° C.))

(2) Resin Component

As the ethylene rubber, the following were used.

"MITSUI 3092EPM" (trade name, manufactured by Mitsui Chemicals, Inc., ethylene-propylene-diene rubber, the content of ethylene: 65%, the content of diene: 4.6%)

"MITSUI 0045" (trade name, manufactured by Mitsui Chemicals, Inc., ethylene-propylene rubber, the content of ethylene: 51 mass %)

"EP11" (trade name, manufactured by JSR, ethylene-propylene rubber, the content of ethylene: 52 mass %)

As the polyolefin resin, the following were used.

"SEPTON 4077" (trade name, manufactured by Kuraray Co., Ltd., styrene-based elastomers (SEEPS), the content of styrene: 30 mass %)

"DYNARON 1320P" (trade name, manufactured by JSR, styrene-based elastomers (hydrogenated styrene/butadiene rubber (HSBR)), the content of styrene: 10 mass %)

"ENGAGE 8150" (trade name, manufactured by Dow Chemical Japan Ltd., metallocene polyethylene (LLDPE))

"Evolue SP2520" (trade name, manufactured by Prime Polymer Co., Ltd., metallocene polyethylene (LLDPE))
"ENGAGE 7256" (trade name, manufactured by Dow Chemical Japan Ltd., linear low-density polyethylene (LLDPE), density 0.885 g/cm$^3$)
"ADMER XE-070" (trade name, manufactured by Mitsui Chemicals, Inc., maleic anhydride-modified ethylene-α-olefin copolymer)
"PB222A" (trade name, manufactured by SunAllomer Ltd., random polypropylene)
<Organic Peroxide>
"PERHEXA 25B" (trade name, manufactured by NOF CORPORATION, 2,5-dimethyl-2,5-di(tert-butylperoxy)hexane, decomposition temperature: 149° C.)
<Inorganic Filler>
Magnesium hydroxide (trade name: KISUMA 5, manufactured by Kyowa Chemical Industry Co., Ltd., average particle diameter: 0.8 μm)
Aluminum hydroxide (trade name: Higilite H42M, manufactured by SHOWA DENKO K.K., average particle diameter: 1.2 μm)
Calcium carbonate (trade name: SOFTON 1200, manufactured by BIHOKU FUNKA KOGYO Co., Ltd., average particle diameter: 1.5 μm)
Antimony trioxide (trade name: PATOX-C, manufactured by NIHON SEIKO Co., Ltd., average particle diameter: 3.5 μm)
Silica (trade name: CRYSTALITE 5x, manufactured by TATSUMORI LTD., average particle diameter 1.2 μm)
<Silane Coupling Agent>
"KBM-1003" (trade name, manufactured by Shin-Etsu Chemical Co., Ltd., vinyltrimethoxysilane)
"KBE-1003" (trade name, manufactured by Shin-Etsu Chemical Co., Ltd., vinyltriethoxysilane)
<Carrier Resin>
"UE320" (manufactured by Japan Polyethylene Corporation, NOVATEC PE (trade name), linear low-density polyethylene (LLDPE))
<Silanol Condensation Catalyst>
"ADKSTAB OT-1" (trade name, manufactured by ADEKA CORPORATION, dioctyl tin dilaurate)
<Antioxidant (Hindered Phenol Antioxidant)>
"IRGANOX 1076" (trade name, manufactured by BASF, octadecyl-3-(3,5-di-tert-butyl-4-hydroxyphenyl)propionate)

Examples 1 to 10 and Comparative Examples 1 to 6

In the mass ratios shown in Table 1, an organic peroxide, an inorganic filler, and a silane coupling agent were placed in a 10 L Henschel mixer manufactured by Toyo Seiki Kogyo Co., Ltd., and then mixed at room temperature (25° C.) for 1 hour in the mixer, to obtain a powder mixture.
Subsequently, in the mass ratios shown in Table 1, the powder mixture and a resin component and an oil component that constitute the base resin ($R_B$) were placed in a 2 L Banbury mixer manufactured by Nippon Roll MFG Co., Ltd., and kneaded at a temperature equal to or higher than the decomposition temperature of the organic peroxide, specifically a temperature of 180° C. to 190° C., for about 12 minutes at the revolution number of 35 rpm, and then discharged at a material discharging temperature of 180 to 190° C., to obtain a silane master batch (step (a)). The silane MB obtained contains at least two kinds of silane crosslinkable resins in which silane coupling agents were graft reacted onto the resin components.

On the other hand, in the mass ratios shown in Table 1, a carrier resin, a silanol condensation catalyst, and an antioxidant were separately melt-mixed at 180 to 190° C. using a Banbury mixer, and the resultant mixture was discharged at a material discharging temperature of 180 to 190° C., to obtain a catalyst master batch. This catalyst master batch is a mixture of the carrier resin, the silanol condensation catalyst, and the antioxidant.
Subsequently, in the mass ratios shown in Table 1, that is, in the ratios to be 5 parts by mass of the carrier resin in the catalyst MB with respect to 100 parts by mass of the base resin ($R_B$) in the silane MB, the silane MB and the catalyst MB were melt-mixed using a Banbury mixer at 180° C. (step (b)).
However, in Example 4, a total amount of LLDPE (UE320), which is a part of resin components constituting the base resin ($R_B$), was used as the carrier resin in the catalyst master batch. That is, in Example 4, the silane MB and the catalyst MB were melt-blended in the ratios to be 5 parts by mass of the carrier resin in the catalyst MB for 95 parts by mass of the base resin ($R_B$) in the silane MB in this step (b).
In this manner, the heat-resistant silane crosslinkable resin composition was prepared. This heat-resistant silane crosslinkable resin composition is a mixture of the silane MB and the catalyst MB, and contains at least two kinds of the above-mentioned silane crosslinkable resins.
Subsequently, this heat-resistant silane crosslinkable resin composition was placed in a 40 mm (screw diameter) extruder (compression-zone screw temperature: 190° C., head temperature: 200° C.) with L/D=24 (ratio of screw effective length L to diameter D), and coated on an outside of a 1/0.8 TA conductor at a 1 mm thickness, to obtain an electric wire (non-crosslinked) having an outer diameter of 2.8 mm (step (c)).
The thus-obtained electric wire (non-crosslinked) was allowed to stand for 24 hours under an atmosphere of a temperature of 80° C. and a humidity of 95%, to perform a polycondensation reaction of silanol (step (d)).
In this manner, an electric wire coated with the heat-resistant silane crosslinked resin molded body was manufactured.
This heat-resistant silane crosslinked resin molded body is, as mentioned above, transformed into the above-mentioned silane crosslinked resin in which the silane coupling agent in the silane crosslinkable resin was converted into silanol, and hydroxyl groups in the silanol were crosslinked with each other by the condensation reaction.

Examples 11 to 14

A silane MB (step (a)) and a catalyst MB were prepared, respectively, in the same manner as the above-described Example 1, except that each component shown in Table 2 was used in the mass ratio (parts by mass) shown in the same Table.
Subsequently, the silane MB and the catalyst MB thus obtained were placed in a closed-type ribbon blender, and dry-blended at room temperature (25° C.) for 5 minutes, to obtain a dry-blended product. On the above occasion, a mixing ratio of the silane MB to the catalyst MB was adjusted to a mass ratio (see Table 2) to be 95 parts by mass of the base resin in the silane MB to 5 parts by mass of the carrier resin in the catalyst MB. Subsequently, this dry-blended product was placed in a 40 mm extruder (compression zone screw temperature: 190° C., head temperature: 200° C.) with L/D=24, and coated on the outside of a 1/0.8

TA conductor at a 1 mm thickness while melt-blending was performed in the extruder screw, to obtain an electric wire (non-crosslinked) having an outer diameter of 2.8 mm (step (b) and step (c)).

The thus-obtained electric wire (non-crosslinked) was allowed to stand for 24 hours under an atmosphere of a temperature of 80° C. and a humidity of 95% (step (d)).

In this manner, an electric wire coated with the heat-resistant silane crosslinked resin molded body was manufactured.

Examples 15 to 17

An electric wire (outer diameter: 2.8 mm, non-crosslinked) in which a periphery of a conductor was coated with a heat-resistant silane crosslinkable resin composition was obtained in the same manner as the above-described Example 11, except that each component shown in Table 2 was used in the mass ratio (parts by mass) shown in the same Table (step (a), step (b) and step (c)).

The thus-obtained electric wire (non-crosslinked) was allowed to stand for 72 hours under an atmosphere of a temperature of 23° C. and a humidity of 50% (step (d)).

In this manner, an electric wire coated with the heat-resistant silane crosslinked resin molded body was manufactured.

Example 18

A silane MB (step (a)) was prepared in the same manner as the above-described Example 1, except that each component shown in Table 2 was used in the mass ratio (parts by mass) shown in the same Table.

On the other hand, in the mass ratios shown in Table 2, a carrier resin "UE320", a silanol condensation catalyst, and an antioxidant were melt-mixed in a twin-screw extruder, to obtain a catalyst MB. A screw diameter of the twin-screw extruder was 35 mm, and cylinder temperature was set to 180 to 190° C. The catalyst MB obtained is a mixture of the carrier resin, the silanol condensation catalyst, and the antioxidant.

Subsequently, the silane MB and the catalyst MB obtained were melt-mixed using a Banbury mixer at 180° C. (step (b)). A mixing ratio of the silane MB to the catalyst MB was adjusted to a mass ratio (see Table 2) to be 100 parts by mass of the base resin in the silane MB to 5 parts by mass of the carrier resin in the catalyst MB. In this manner, a heat-resistant silane crosslinkable resin composition was prepared. This heat-resistant silane crosslinkable resin composition is a mixture of the silane MB and the catalyst MB, and contains at least two kinds of the above-mentioned silane crosslinkable resins.

Subsequently, this heat-resistant silane crosslinkable resin composition was placed in a 40 mm extruder (compression zone screw temperature: 190° C., head temperature: 200° C.) with L/D=24, and coated on an outside of 1/0.8 TA conductor at a 1 mm thickness, to obtain an electric wire (non-crosslinked) having an outer diameter of 2.8 mm (step (c)).

The electric wire (non-crosslinked) obtained was allowed to stand in a state in which the wire was immersed into warm water having a temperature of 50° C. for 10 hours (step (d)).

In this manner, an electric wire having a coating formed of the heat-resistant silane crosslinked resin molded body was manufactured.

The electric wires thus manufactured were subjected to the following evaluation, and the results thereof are shown in Tables 1 and 2.

<Heat Deformation Test>

A heat deformation test was conducted to evaluate heat resistance of the electric wire.

The heat deformation test was conducted at the measurement temperature of 150° C. and a load of 5 N, based on UL1581. In the heat deformation test, 50% or less is an acceptable level.

<Collapse Test of Electric Wire>

Collapsibility of an electric wire was tested.

As a collapse test 1, an evaluation was made, in accordance with the heat deformation test in JIS C 3005; a force of 39 N was applied for 30 minutes at ordinary temperature (25° C.), and a deformation amount in a coated portion of the electric wire after 1 hour from removing the force was determined.

The deformation amount was calculated from an expression:

$$((\text{outer diameter of electric wire before deformation} - \text{outer diameter of conductor}) - (\text{outer diameter of electric wire after deformation} - \text{outer diameter of conductor})) / (\text{outer diameter of electric wire before deformation} - \text{outer diameter of conductor}) \times 100.$$

In the collapse test 1, 15% or less of the deformation amount is an acceptable level, and 10% or less of the deformation amount is significantly excellent, and is a desired level.

As a collapse test 2, an evaluation was made, in the same manner as the collapse test 1; a force of 20 N was applied at 120° C. for 30 minutes, and a deformation amount of a coated portion of the electric wire after 1 hour from removing the force was determined.

In the collapse test 2, 25% or less of the deformation amount is an acceptable level, and 15% or less of the deformation amount is significantly excellent, and is a desired level.

<Hot Set Test>

A hot set test was conducted to evaluate heat resistance of the electric wire.

As the hot set test, a tubular piece of the electric wire was prepared, a gauge line of 50 mm in length was marked thereto, and then after setting a pendulum of 117 g to the tubular piece, the tubular piece was left for 15 minutes in a constant temperature chamber of 170° C. Thereafter, the length after being left was measured, to obtain elongation percentage.

As the hot set test, an evaluation was made based on elongation percentage, and 100% or less is an acceptable level.

<Extrusion Appearance Properties of Electric Wire>

Extrusion appearance tests 1 and 2 were performed to evaluate extrusion appearance properties of electric wires.

In the extrusion appearance test 1, evaluation was made by observing extrusion appearance at the time of manufacturing electric wires. Specifically, extrusion was conducted using an extruder having a screw diameter of 65 mm at a linear velocity of 50 m/min, an electric wire having favorable appearance is taken as "A", one having slightly poor appearance is taken as "B", and one having significantly poor appearance is taken as "C", and "A" and "B" are acceptable as products.

To evaluate extrusion appearance properties of electric wires, the extrusion appearance test 2 was conducted, in which an extruder was once stopped, and then the operation was resumed.

In the extrusion appearance test 2, evaluation was made in the following manner: at the time of manufacturing electric wires, operation of an extruder having a screw diameter of 65 mm was conducted at a linear velocity to 50 m/min to manufacture electric wire, and the extruder was once stopped on the way, and 10 minutes later, the operation of the extruder was resumed under the same conditions to manufacture electric wire; and the appearance of the thus-obtained electric wire was observed. Specifically, the appearance of the electric wire extruded after 5 minutes from resuming the operation of the extruder with re-setting the linear velocity to 50 m/min was observed.

In the evaluation, when observed at the time after 5 minutes from re-setting the linear velocity to 50 m/min, an electric wire having a favorable appearance and having 2 pieces or less of aggregated substances in 1 m is taken as "A", and one having a slightly poor appearance or confirmed with 3 to 9 pieces of aggregated substances per 1 m is taken as "B", and one having significantly poor appearance or confirmed with 10 or more pieces of aggregated substances in 1 m is taken as "C", and "A" and "B" are acceptable as products.

TABLE 1

| | | | | | This invention | | | | |
|---|---|---|---|---|---|---|---|---|---|
| | | | | | 1 | 2 | 3 | 4 | 5 |
| Step (a) Silane MB | Base resin ($R_B$) | Ethylene rubber | MITSUI 3092M | EPDM | 20 | 25 | 30 | | |
| | | | MITSUI 0045 | EPM | | | | 30 | |
| | | | EP11 | EPM | | | | 10 | 10 |
| | | Non-aromatic organic oil | DIANA PROCESS PW90 | Paraffin oil | 35 | 25 | 20 | 20 | 20 |
| | | Polyolefin resin | SEPTON 4077 | Styrene-based elastomer | 20 | | | 30 | 30 |
| | | | DYNARON 1320P | Styrene-based elastomer | | | | | |
| | | | ENGAGE 8150 | LLDPE | | | | | |
| | | | Evolue SP2520 | LLDPE | | | | | |
| | | | ENGAGE 7256 | LLDPE | 18 | 43 | 10 | 30 | 30 |
| | | | XE-070 | Modified ethylene-α-olefin copolymer | 2 | 2 | | | |
| | | | PB222A | PP | 5 | 5 | 10 | 5 | 10 |
| | | Content of styrene-based elastomer with respect to 100 parts by mass of ethylene rubber | | | 100 | 0 | 0 | 300 | 300 |
| | | Content ratio (times) | Non-aromatic organic oil/(ethylene rubber + styrene-based elastomer) | | 0.9 | 1.0 | 0.3 | 0.5 | 0.5 |
| | | Content ratio | (Non-aromatic organic oil:ethylene rubber) | | 7:4 | 1:1 | 1:3 | 2:1 | 2:1 |
| | | | (Non-aromatic organic oil:styrene-based elastomer) | | 7:4 | — | — | 2:3 | 2:3 |
| | Organic peroxide | PERHEXA 25B | | | 0.1 | 0.1 | 0.1 | 0.1 | 0.1 |
| | Inorganic filler | Magnesium hydroxide | | Particle diameter: 0.8 μm | 100 | 100 | 100 | 15 | 380 |
| | | Aluminum hydroxide | | Particle diameter: 1.2 μm | | | | | |
| | | Calcium carbonate | | Particle diameter: 1.5 μm | | | | | |
| | | Antimony trioxide | | Particle diameter: 3.5 μm | | | | | |
| | | Silica | | Particle diameter: 1.2 μm | | | | | |
| | Silane coupling agent | KBM-1003 | Vinyltrimethoxysilane | | 7 | 7 | 7 | 1.5 | 14 |
| | | KBE-1003 | Vinyltriethoxysilane | | | | | | |
| Step (b) Catalyst MB | Carrier resin | UE320 | LLDPE | | 5 | 5 | 5 | 5 | 5 |
| | Silanol condensation catalyst | ADKSTAB OT-1 | | | 0.05 | 0.15 | 0.15 | 0.15 | 0.15 |
| | Antioxidant | IRGANOX 1076 | | | 1 | 1 | 1 | 1 | 1 |
| Evaluation | | Heat deformation test | | | 14 | 25 | 10 | 46 | 15 |
| | | Collapse test 1 | | | 5 | 8 | 3 | 12 | 10 |
| | | Collapse test 2 | | | 14 | 18 | 10 | 23 | 18 |
| | | Hot set test | | | 30 | 45 | 20 | 80 | 60 |
| | | Extrusion appearance 1 | | | A | A | A | A | A |
| | | Extrusion appearance 2 | | | A | A | B | B | B |

| | | | | | This invention | | | | |
|---|---|---|---|---|---|---|---|---|---|
| | | | | | 6 | 7 | 8 | 9 | 10 |
| Step (a) Silane MB | Base resin ($R_B$) | Ethylene rubber | MITSUI 3092M | EPDM | 10 | 10 | 10 | 10 | 20 |
| | | | MITSUI 0045 | EPM | | | | | 20 |
| | | | EP11 | EPM | 10 | 10 | 10 | 10 | |
| | | Non-aromatic organic oil | DIANA PROCESS PW90 | Paraffin oil | 30 | 30 | 30 | 30 | 20 |
| | | Polyolefin resin | SEPTON 4077 | Styrene-based elastomer | 30 | 30 | 30 | 30 | 30 |
| | | | DYNARON 1320P | Styrene-based elastomer | | | | | |

TABLE 1-continued

|  |  |  |  |  |  |  |  |  |
|---|---|---|---|---|---|---|---|---|
|  |  |  | ENGAGE 8150 | LLDPE |  |  |  |  |
|  |  |  | Evolue SP2520 | LLDPE |  |  |  |  | 10 |
|  |  |  | ENGAGE 7256 | LLDPE | 15 | 15 | 15 | 15 |  |
|  |  |  | XE-070 | Modified ethylene-α-olefin copolymer |  |  |  |  |  |
|  |  |  | PB222A | PP | 5 | 5 | 5 | 5 |  |
|  |  | Content of styrene-based elastomer with respect to 100 parts by mass of ethylene rubber |  |  | 150 | 150 | 150 | 150 | 75 |
|  |  | Content ratio (times) | Non-aromatic organic oil/(ethylene rubber + styrene-based elastomer) |  | 0.6 | 0.6 | 0.6 | 0.6 | 0.3 |
|  |  | Content ratio | (Non-aromatic organic oil:ethylene rubber) |  | 3:2 | 3:2 | 3:2 | 3:2 | 1:2 |
|  |  |  | (Non-aromatic organic oil:styrene-based elastomer) |  | 1:1 | 1:1 | 1:1 | 1:1 | 2:3 |
|  | Organic peroxide |  | PERHEXA 25B | — | 0.1 | 0.1 | 0.1 | 0.1 | 0.25 |
|  | Inorganic filler |  | Magnesium hydroxide | Particle diameter: 0.8 μm |  |  |  | 70 | 100 |
|  |  |  | Aluminum hydroxide | Particle diameter: 1.2 μm | 100 |  |  |  |  |
|  |  |  | Calcium carbonate | Particle diameter: 1.5 μm |  |  | 100 |  |  |
|  |  |  | Antimony trioxide | Particle diameter: 3.5 μm |  |  |  | 30 |  |
|  |  |  | Silica | Particle diameter: 1.2 μm |  |  |  |  | 50 |
|  | Silane coupling agent |  | KBM-1003 | Vinyltrimethoxysilane | 7 | 7 | 7 | 5 | 7 |
|  |  |  | KBE-1003 | Vinyltriethoxysilane |  |  |  |  |  |
| Step (b) Catalyst MB | Carrier resin |  | UE320 | LLDPE | 5 | 5 | 5 | 5 | 5 |
|  | Silanol condensation catalyst |  | ADKSTAB OT-1 |  | 0.15 | 0.15 | 0.15 | 0.15 | 0.15 |
|  | Antioxidant |  | IRGANOX 1076 |  | 1 | 1 | 1 | 1 | 1 |
| Evaluation |  |  | Heat deformation test |  | 12 | 18 | 18 | 17 | 11 |
|  |  |  | Collapse test 1 |  | 6 | 7 | 10 | 8 | 4 |
|  |  |  | Collapse test 2 |  | 19 | 18 | 22 | 18 | 9 |
|  |  |  | Hot set test |  | 40 | 50 | 60 | 40 | 25 |
|  |  |  | Extrusion appearance 1 |  | A | A | A | A | A |
|  |  |  | Extrusion appearance 2 |  | A | A | A | A | A |

|  |  |  |  |  |  | Comparative example |  |  |
|---|---|---|---|---|---|---|---|---|
|  |  |  |  |  |  | 1 | 2 | 3 |
| Step (a) Silane MB | Base resin ($R_B$) | Ethylene rubber | MITSUI 3092M | EPDM |  |  |  | 30 |
|  |  |  | MITSUI 0045 | EPM |  |  |  |  |
|  |  |  | EP11 | EPM |  |  |  |  |
|  |  | Non-aromatic organic oil | DIANA PROCESS PW90 | Paraffin oil |  |  |  |  |
|  |  | Polyolefin resin | SEPTON 4077 | Styrene-based elastomer |  |  |  |  |
|  |  |  | DYNARON 1320P | Styrene-based elastomer |  |  | 30 |  |
|  |  |  | ENGAGE 8150 | LLDPE |  |  |  |  |
|  |  |  | Evolue SP2520 | LLDPE |  |  |  |  |
|  |  |  | ENGAGE 7256 | LLDPE |  | 90 | 70 | 70 |
|  |  |  | XE-070 | Modified ethylene-α-olefin copolymer |  |  |  |  |
|  |  |  | PB222A | PP |  | 10 |  |  |
|  |  | Content of styrene-based elastomer with respect to 100 parts by mass of ethylene rubber |  |  | — | — | 0 |
|  |  | Content ratio (times) | Non-aromatic organic oil/(ethylene rubber + styrene-based elastomer) |  | 0 | 0 | 0 |
|  |  | Content ratio | (Non-aromatic organic oil:ethylene rubber) |  | — | — | — |
|  |  |  | (Non-aromatic organic oil:styrene-based elastomer) |  | — | — | — |
|  | Organic peroxide |  | PERHEXA 25B | — | 0.1 | 0.1 | 0.1 |
|  | Inorganic filler |  | Magnesium hydroxide | Particle diameter: 0.8 μm | 100 | 100 | 100 |
|  |  |  | Aluminum hydroxide | Particle diameter: 1.2 μm |  |  |  |
|  |  |  | Calcium carbonate | Particle diameter: 1.5 μm |  |  |  |
|  |  |  | Antimony trioxide | Particle diameter: 3.5 μm |  |  |  |
|  |  |  | Silica | Particle diameter: 1.2 μm |  |  |  |
|  | Silane coupling agent |  | KBM-1003 | Vinyltrimethoxysilane | 7 | 7 | 7 |
|  |  |  | KBE-1003 | Vinyltriethoxysilane |  |  |  |
| Step (b) Catalyst MB | Carrier resin |  | UE320 | LLDPE | 5 | 5 | 5 |
|  | Silanol condensation catalyst |  | ADKSTAB OT-1 |  | 0.05 | 0.05 | 0.15 |
|  | Antioxidant |  | IRGANOX 1076 |  | 1 | 1 | 1 |

TABLE 1-continued

| Evaluation | Heat deformation test | | | 38 | 60 | 42.5 |
|---|---|---|---|---|---|---|
| | Collapse test 1 | | | 14 | 16 | 8 |
| | Collapse test 2 | | | 30 | 35 | 17 |
| | Hot set test | | | 85 | Cut | 50 |
| | Extrusion appearance 1 | | | A | A | A |
| | Extrusion appearance 2 | | | A | C | C |

| | | | | | | Comparative example | | |
|---|---|---|---|---|---|---|---|---|
| | | | | | | 4 | 5 | 6 |
| Step (a) Silane MB | Base resin ($R_B$) | Ethylene rubber | MITSUI 3092M | EPDM | | 20 | 20 | 20 |
| | | | MITSUI 0045 | EPM | | | | |
| | | | EP11 | EPM | | | | |
| | | Non-aromatic organic oil | DIANA PROCESS PW90 | Paraffin oil | | 35 | 35 | 35 |
| | | Polyolefin resin | SEPTON 4077 | Styrene-based elastomer | | 20 | 20 | 20 |
| | | | DYNARON 1320P | Styrene-based elastomer | | | | |
| | | | ENGAGE 8150 | LLDPE | | | | |
| | | | Evolue SP2520 | LLDPE | | | | |
| | | | ENGAGE 7256 | LLDPE | | 18 | 18 | 18 |
| | | | XE-070 | Modified ethylene-α-olefin copolymer | | 2 | 2 | 2 |
| | | | PB222A | PP | | 5 | 5 | 5 |
| | | Content of styrene-based elastomer with respect to 100 parts by mass of ethylene rubber | | | | 100 | 100 | 100 |
| | | Content ratio (times) | Non-aromatic organic oil/(ethylene rubber + styrene-based elastomer) | | | 0.9 | 0.9 | 0.9 |
| | | Content ratio | (Non-aromatic organic oil:ethylene rubber) | | | 7:4 | 7:4 | 7:4 |
| | | | (Non-aromatic organic oil:styrene-based elastomer) | | | 7:4 | 7:4 | 7:4 |
| | Organic peroxide | | PERHEXA 25B | — | | | 1.0 | 0.1 |
| | Inorganic filler | | Magnesium hydroxide | Particle diameter: 0.8 μm | | 100 | 100 | 2 |
| | | | Aluminum hydroxide | Particle diameter: 1.2 μm | | | | |
| | | | Calcium carbonate | Particle diameter: 1.5 μm | | | | |
| | | | Antimony trioxide | Particle diameter: 3.5 μm | | | | |
| | | | Silica | Particle diameter: 1.2 μm | | | | |
| | Silane coupling agent | | KBM-1003 | Vinyltrimethoxysilane | | 7 | 7 | 3 |
| | | | KBE-1003 | Vinyltriethoxysilane | | | | |
| Step (b) Catalyst MB | Carrier resin | | UE320 | LLDPE | | 5 | 5 | 5 |
| | Silanol condensation catalyst | | ADKSTAB OT-1 | | | 0.15 | 0.15 | 0.15 |
| | Antioxidant | | IRGANOX 1076 | | | 1 | 1 | 1 |
| Evaluation | | | Heat deformation test | | | 92 | Cannot be molded | 73 |
| | | | Collapse test 1 | | | 16 | | 18 |
| | | | Collapse test 2 | | | 68 | | 60 |
| | | | Hot set test | | | Cut | | Cut |
| | | | Extrusion appearance 1 | | | A | | C |
| | | | Extrusion appearance 2 | | | A | | C |

TABLE 2

| | | | | | | This invention | | | |
|---|---|---|---|---|---|---|---|---|---|
| | | | | | | 11 | 12 | 13 | 14 |
| Step (a) Silane MB | Base resin ($R_B$) | Ethylene rubber | MITSUI 3092M | EPDM | | 20 | 30 | 10 | 10 |
| | | | MITSUI 0045 | EPM | | | 30 | | |
| | | | EP11 | EPM | | | | 10 | 10 |
| | | Non-aromatic organic oil | DIANA PROCESS PW90 | Paraffin oil | | 35 | 20 | 30 | 30 |
| | | Polyolefin resin | SEPTON 4077 | Styrene-based elastomer | | 20 | | 30 | 30 |
| | | | DYNARON 1320P | Styrene-based elastomer | | | | | |
| | | | ENGAGE 8150 | LLDPE | | | | | |
| | | | Evolue SP2520 | LLDPE | | | | | |

TABLE 2-continued

|  |  |  |  |  |  |  |  |  |
|---|---|---|---|---|---|---|---|---|
|  |  |  | ENGAGE 7256 | LLDPE | 18 | 10 | 15 | 15 |
|  |  |  | XE-070 | Modified ethylene-α-olefin copolymer | 2 |  |  |  |
|  |  |  | PB222A | PP | 5 | 10 | 5 | 5 |
|  |  | Content of styrene-based elastomer with respect to 100 parts by mass of ethylene rubber |  |  | 100 | 0 | 150 | 150 |
|  |  | Content ratio (times) | Non-aromatic organic oil/(ethylene rubber + styrene-based elastomer) |  | 0.9 | 0.3 | 0.6 | 0.6 |
|  |  | Content ratio | (Non-aromatic organic oil:ethylene rubber) |  | 7:4 | 1:3 | 3:2 | 3:2 |
|  |  |  | (Non-aromatic organic oil:styrene-based elastomer) |  | 7:4 | — | 1:1 | 1:1 |
|  |  | Organic peroxide | PERHEXA 25B |  | 0.1 | 0.1 | 0.1 | 0.1 |
|  |  | Inorganic filler | Magnesium hydroxide | Particle diameter: 0.8 μm | 100 | 100 |  |  |
|  |  |  | Aluminum hydroxide | Particle diameter: 1.2 μm |  |  |  |  |
|  |  |  | Calcium carbonate | Particle diameter: 1.5 μm |  |  | 100 |  |
|  |  |  | Antimony trioxide | Particle diameter: 3.5 μm |  |  |  |  |
|  |  |  | Silica | Particle diameter: 1.2 μm |  |  |  | 50 |
|  |  | Silane coupling agent | KBM-1003 | Vinyltrimethoxysilane | 7 | 7 | 7 | 5 |
|  |  |  | KBE-1003 | Vinyltriethoxysilane |  |  |  |  |
| Step (b) Catalyst MB |  | Carrier resin | UE320 | LLDPE | 5 | 5 | 5 | 5 |
|  |  | Silanol condensation catalyst | ADKSTAB OT-1 |  | 0.05 | 0.15 | 0.15 | 0.15 |
|  |  | Antioxidant | IRGANOX 1076 |  | 1 | 1 | 1 | 1 |
| Evaluation |  |  | Heat deformation test |  | 13 | 10 | 17 | 15 |
|  |  |  | Collapse test 1 |  | 4 | 4 | 8 | 8 |
|  |  |  | Collapse test 2 |  | 13 | 10 | 17 | 18 |
|  |  |  | Hot set test |  | 20 | 20 | 40 | 40 |
|  |  |  | Extrusion appearance 1 |  | A | A | A | A |
|  |  |  | Extrusion appearance 2 |  | A | B | A | A |

|  |  |  |  |  | This invention ||||
|---|---|---|---|---|---|---|---|---|
|  |  |  |  |  | 15 | 16 | 17 | 18 |
| Step (a) Silane MB | Base resin ($R_B$) | Ethylene rubber | MITSUI 3092M | EPDM | 20 | 10 | 10 | 20 |
|  |  |  | MITSUI 0045 | EPM |  |  |  |  |
|  |  |  | EP11 | EPM |  | 10 | 10 |  |
|  |  | Non-aromatic organic oil | DIANA PROCESS PW90 | Paraffin oil | 35 | 30 | 30 | 35 |
|  |  | Polyolefin resin | SEPTON 4077 | Styrene-based elastomer | 20 | 30 | 30 | 20 |
|  |  |  | DYNARON 1320P | Styrene-based elastomer |  |  |  |  |
|  |  |  | ENGAGE 8150 | LLDPE |  |  |  |  |
|  |  |  | Evolue SP2520 | LLDPE |  |  |  |  |
|  |  |  | ENGAGE 7256 | LLDPE | 18 | 15 | 15 | 18 |
|  |  |  | XE-070 | Modified ethylene-α-olefin copolymer | 2 |  |  | 2 |
|  |  |  | PB222A | PP | 5 | 5 | 5 | 5 |
|  |  | Content of styrene-based elastomer with respect to 100 parts by mass of ethylene rubber |  |  | 100 | 150 | 150 | 100 |
|  |  | Content ratio (times) | Non-aromatic organic oil/(ethylene rubber + styrene-based elastomer) |  | 0.9 | 0.6 | 0.6 | 0.9 |
|  |  | Content ratio | (Non-aromatic organic oil:ethylene rubber) |  | 7:4 | 3:2 | 3:2 | 7:4 |
|  |  |  | (Non-aromatic organic oil:styrene-based elastomer) |  | 7:4 | 1:1 | 1:1 | 7:4 |
|  |  | Organic peroxide | PERHEXA 25B |  | 0.1 | 0.1 | 0.1 | 0.1 |
|  |  | Inorganic filler | Magnesium hydroxide | Particle diameter: 0.8 μm | 100 |  |  | 100 |
|  |  |  | Aluminum hydroxide | Particle diameter: 1.2 μm |  |  |  |  |
|  |  |  | Calcium carbonate | Particle diameter: 1.5 μm |  |  | 100 |  |
|  |  |  | Antimony trioxide | Particle diameter: 3.5 μm |  |  |  |  |
|  |  |  | Silica | Particle diameter: 1.2 μm |  |  | 50 |  |
|  |  | Silane coupling agent | KBM-1003 | Vinyltrimethoxysilane | 7 | 7 | 5 | 7 |
|  |  |  | KBE-1003 | Vinyltriethoxysilane |  |  |  |  |
| Step (b) Catalyst MB |  | Carrier resin | UE320 | LLDPE | 5 | 5 | 5 | 5 |
|  |  | Silanol condensation catalyst | ADKSTAB OT-1 |  | 0.05 | 0.15 | 0.15 | 0.05 |
|  |  | Antioxidant | IRGANOX 1076 |  | 1 | 1 | 1 | 1 |

TABLE 2-continued

| Evaluation | | | | | |
|---|---|---|---|---|---|
| | Heat deformation test | 16 | 19 | 16 | 16 |
| | Collapse test 1 | 5 | 7 | 8 | 6 |
| | Collapse test 2 | 14 | 16 | 17 | 15 |
| | Hot set test | 30 | 40 | 40 | 20 |
| | Extrusion appearance 1 | A | A | A | A |
| | Extrusion appearance 2 | A | A | A | A |

As is clear from the results in Table 1 and Table 2, in all of Examples 1 to 18, the electric wires passed the collapse tests 1 and 2, the heat deformation tests, the hot set tests and the extrusion appearance tests 1 and 2, and it was possible to manufacture electric wires that were hard to collapse due to the load of external force and had excellent heat resistance and appearance.

In addition, excellence of the flame retardancy can be easily understood from the mixing amount of the inorganic filler.

In contrast, in Comparative Example 1 in which neither the ethylene rubber nor the non-aromatic organic oil was contained, the electric wire failed in the collapse test 2. In addition, in Comparative Example 2 similar thereto, the electric wire failed in all tests excluding the extrusion appearance 1.

In Comparative Example 3 in which no non-aromatic organic oil was contained, the electric wire failed in the extrusion appearance test 2.

In Comparative Example 4 in which no organic peroxide was contained, the electric wire failed in all of the heat deformation test, the collapse tests 1 and 2 and the hot set test.

In Comparative Example 5 in which the amount of using the organic peroxide was large, even extrusion molding was unable to be made.

In Comparative Example 6 in which the content of the inorganic filler was small, the electric wire failed in all tests.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method of producing a heat-resistant silane crosslinked resin molded body, comprising:
   (a) a step of preparing a silane master batch by melt-kneading, to 100 parts by mass of a base resin ($R_B$) containing a non-aromatic organic oil and an ethylene rubber containing a terpolymer of ethylene, α-olefin and diene, from 0.01 to 0.6 parts by mass of an organic peroxide, from 10 to 400 parts by mass of an inorganic filler, and from 1 to 15.0 parts by mass of a silane coupling agent, at a temperature equal to or higher than the decomposition temperature of the organic peroxide,
   (b) a step of obtaining a mixture by mixing the silane master batch and a silanol condensation catalyst,
   (c) a step of obtaining a molded body by molding the mixture, and
   (d) a step of obtaining a heat-resistant silane crosslinked resin molded body by contacting the molded body with water,
   wherein a content of said ethylene rubber in the base resin ($R_B$) is from 15 to 55 mass %.

2. The method of producing a heat-resistant silane crosslinked resin molded body according to claim 1, wherein the base resin ($R_B$) further comprises a styrene-based elastomer.

3. The method of producing a heat-resistant silane crosslinked resin molded body according to claim 1, wherein the silane coupling agent is vinyltrimethoxysilane or vinyltriethoxysilane.

4. The method of producing a heat-resistant silane crosslinked resin molded body according to claim 1, wherein the inorganic filler is at least one selected from the group consisting of silica, aluminum hydroxide, magnesium hydroxide, calcium carbonate, and antimony trioxide.

5. The method of producing a heat-resistant silane crosslinked resin molded body according to claim 1, wherein the melt-kneading at the step (a) is performed in an enclosed mixer.

6. The method of producing a heat-resistant silane crosslinked resin molded body according to claim 1, wherein substantially no silanol condensation catalyst is mixed in the step (a).

7. A method of producing a heat-resistant silane crosslinkable resin composition, comprising:
   (a) a step of preparing a silane master batch by melt-kneading, to 100 parts by mass of a base resin ($R_B$) containing a non-aromatic organic oil and an ethylene rubber containing a terpolymer of ethylene, α-olefin and diene, from 0.01 to 0.6 parts by mass of an organic peroxide, from 10 to 400 parts by mass of an inorganic filler, and from 1 to 15.0 parts by mass of a silane coupling agent, at a temperature equal to or higher than the decomposition temperature of the organic peroxide, and
   (b) a step of obtaining a mixture by mixing the silane master batch and a silanol condensation catalyst,
   wherein a content of said ethylene rubber in the base resin ($R_B$) is from 15 to 55 mass %.

8. A heat-resistant silane crosslinkable resin composition produced by the method according to claim 7.

9. A heat-resistant silane crosslinked resin molded body produced by the method according to claim 1.

10. The heat-resistant silane crosslinked resin molded body according to claim 9, wherein the heat-resistant silane crosslinked resin molded body contains a resin crosslinked with the inorganic filler through a silanol bond in the silane coupling agent.

11. A heat-resistant product having the heat-resistant silane crosslinked resin molded body according to claim 9.

12. The heat-resistant product according to claim 11, wherein the heat-resistant silane crosslinked resin molded body is provided as a coating for an electric wire or an optical fiber cable.

13. A silane master batch, for use in a production of a heat-resistant silane crosslinkable resin composition formed by melt-mixing, to 100 parts by mass of a base resin ($R_B$) containing a non-aromatic organic oil and an ethylene rubber containing a terpolymer of ethylene, α-olefin and diene, from 0.01 to 0.6 parts by mass of an organic peroxide, from 10 to 400 parts by mass of an inorganic filler, from 1 to 15.0 parts by mass of a silane coupling agent, and a silanol condensation catalyst, wherein all or part of the base resin ($R_B$), the organic peroxide, the inorganic filler, and the silane coupling agent are melt-mixed at a temperature equal to or higher than the decomposition temperature of the organic peroxide, and wherein a content of said ethylene rubber in the base resin ($R_B$) is from 15 to 55 mass %.

* * * * *